United States Patent [19]
Dolby et al.

[11] Patent Number: 5,630,025
[45] Date of Patent: May 13, 1997

[54] GENERALIZED CONFIGURATOR USING A DECLARATIVELY CONSTRUCTED TWO-LEVEL BI-PARTITE GRAPH AS A KNOWLEDGE REPRESENTATION

[75] Inventors: Nigel L Dolby, Ham Lake; Timothy E. Nagle, Bloomington; Thomas R. Goessling, Burnsville, all of Minn.

[73] Assignee: UNISYS Corporation, Blue Bell, Pa.

[21] Appl. No.: 274,618

[22] Filed: Jul. 13, 1994

[51] Int. Cl.$^6$ .................................................. G06F 17/00
[52] U.S. Cl. ............................. 395/51; 395/60; 395/63; 395/50
[58] Field of Search ............................. 395/50, 51, 54, 395/919, 10–13, 60–61, 76

[56] References Cited

U.S. PATENT DOCUMENTS

| | | | |
|---|---|---|---|
| 5,175,800 | 12/1992 | Galis et al. | 395/51 |
| 5,293,479 | 3/1994 | Quintero et al. | 395/161 |
| 5,307,261 | 4/1994 | Maki et al. | 364/401 |
| 5,367,473 | 11/1994 | Chu et al. | 364/551.01 |
| 5,394,522 | 2/1995 | Sanchez-Frank et al. | 395/159 |
| 5,402,349 | 3/1995 | Fujita et al. | 364/468 |

OTHER PUBLICATIONS

Tanimoto, Steven L. "The Elements of Artificial Intelligence: An Introduction Using LISP." Computer Science Press, Inc. Dec. 1987.
McDermott, J., "R1: An Expert In The Computer Systems Domain," Proceedings of the AAAI, 1980.
Sahni, S., "Concepts In Discrete Mathematics," The Camelot Publishing Co., 1981, pp. 331–336.
McDermott, J., "R1, The Formative Years," AI Magazine, Summer 1981, pp. 21–29.
McDermott, J., "R1: A Rule-Based Configurer Of Computer Systems," Artificial Intelligence, vol. 19, 1982, pp. 39–88.
Rich, E., "Artificial Intelligence," McGraw-Hill, Inc., 1983, pp. 213–233.
Hayes-Roth, F., "The Knowledge-Based Expert System: A Tutorial," Computer, Sep. 1984, pp. 11–28.
Forsyth, R., "The Hitch-hiker's Guide To Artificial Intelligence," Chapman and Hall, Ltd./Methuen London, Ltd., 1985, pp. 11–15, 131–133.
van de Brug, A. "The Taming Of R1," IEEE Experts, Fall 1986, pp. 33–39.
Tanimoto, S. "The Elements Of Artificial Intelligence," Computer Science Press, Inc., 1987, pp. 115–132, 461–473.
Shapiro, S., "The Encyclopedia of Artificial Intelligence," John Wiley & Sons, Inc., 1987, pp. 882–890, 1011–1024.
"Trilogy Development Group: Three Times Nice; Company Profile," EDventure Holdings, Inc., vol. 91, No. 10, 1991, pp. 7–10.

(List continued on next page.)

*Primary Examiner*—Tariq R. Hafiz
*Attorney, Agent, or Firm*—Charles A. Johnson; Mark T. Starr

[57] ABSTRACT

A generalized configuration expert system for generating a complete, legal, and near-optimal configuration for any complex system consisting of multiple components is disclosed. The present invention allows a developer to specify a configurator framework for solving a particular configuration problem. A user then operates the customized configurator to generate a configuration solution based on the user's requests and the system's requirements and constraints. The generalized configurator uses declaratively constructed graphs and multiple interacting packing engines. A two-level, bi-partite, spreading activation graph is used as the knowledge representation of the components to be configured and their associated relationships. The invention dynamically manages the interaction of the multiple packer engines to select the appropriate piece of the total configuration problem to work on at any point in time, while still taking into account the other packing problems. The invention provides the ability to declaratively define the constraints used by the packing engines to assure correct configuration results.

35 Claims, 13 Drawing Sheets

OTHER PUBLICATIONS

"Some Customer Experiences; Customers On Trilogy Development Group's Products," EDventure Holdings, Inc., vol. 91, No. 10, 1991, pp. 11–13.

DePompa, B., "Custom Deals For The Masses," Information Week, Jun. 28, 1993, pp. 50, 52.

Euwe, M.J., "Configuration Of Complex Products," Computers In Industry 21, 1993, pp. 1–10.

38 — ITEM <item-name>
40 — CONSUMES <number-or-expression> <resource-name-or-expression>
42 — SUPPLIES <number-or-expression> <resource-name-or-expression>
44 — CONSTRAINTS <constraint-expressions>
46 — PROPERTY <property-name> <property-value>
48 — ENDITEM <item-name>

FIG. 2

EXTERNAL FORM SYNTAX — 50

*52:*
ITEM CABINET
SUPPLIES 36 CABINET_SPACE
(((POSITION FRONT_ACCESS)
(RANGE 9 26)))
ENDITEM CABINET

*54:*
ITEM POWER_SUPPLY
 CONSUMES 3 CABINET_SPACE
 SUPPLIES 6 SOCKET
 SUPPLIES 800 CURRENT
ENDITEMPOWER_SUPPLY

*56:*
ITEM PERIPHERAL_DEVICE
 CONSUMES 20 CURRENT
 CONSUMES 1 SOCKET
 CONSUMES 1 CHANNEL_CONNECTION
 CONSUMES 4 CABINET_SPACE
 (POSITION FRONT ACCESS)
ENDITEMPERIPHERAL_DEVICE

FIG. 3

DATA ENTRY FORM FOR DISK-USR4000

DISK-USR4000 SCREEN

CONNECTION TYPE: ○ CHANNEL
⦿ DLP

DRIVE COUNT:

419MB ☐
806MB ☐
1545MB(FAST) ☐
1545MB ☐
1545MB(CACHE) ☐
TEXT ▨

OPTIONS:

ENVIRONMENTAL ALARM ☐
POWER CONTROL ☐

INITIATOR 1 ⊢
INITIATOR 2

| PORT 1 | PORT 2 |

OK
CANCEL

FIG. 12

GENERALIZED CONFIGURATOR USING A DECLARATIVELY CONSTRUCTED TWO-LEVEL BI-PARTITE GRAPH AS A KNOWLEDGE REPRESENTATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to artificial intelligence (AI) "expert systems" or "knowledge-based systems." The invention is more specifically related to an expert system for configuring complex system components which uses declaratively constructed graphs for the knowledge representation and multiple interacting packing engines.

2. Background Information

Knowledge-based expert systems incorporate one or more techniques of artificial intelligence to employ human knowledge to solve problems that ordinarily require human intelligence. These expert systems are often formed of computer hardware/software combinations which are structured to mimic the behavior of a human having expert knowledge in a particular field. The expert knowledge is typically contained in a data base called the "knowledge base." The knowledge base may consist of production rules, semantic networks, frames, conceptual dependency graphs, or other paradigms of knowledge representation. The expert system contains one or more inference engines. An inference engine is a logical module which interacts with the knowledge base to generate consequences, conclusions, or decisions from the existing knowledge. It may be a rule interpreter or it may arrive at conclusions by propagating state information in a probabilistic inference network.

For a general explanation of artificial intelligence, knowledge representation, and expert systems, the reader is directed to references such as "Introduction to Artificial Intelligence," by Eugene Charniak and Drew McDermott, Addision Wesley Publishing Company, 1985; "The Handbook of Artificial Intelligence" Vol. 1 (1981) and Vol. 2 (1982) edited by Avron Barr and Edward Feigenbaum, and Vol. 3 (1982), edited by Paul Cohen and Edward Feigenbaum, William Kaufmann, Inc.; "The Hitch-Hiker's Guide to Artificial Intelligence," by Richard Forsyth and Chris Naylor, Chapman and Hall Ltd./Methuen London Ltd., 1985; and "The Encyclopedia of Artificial Intelligence," edited by Stuart C. Shapiro, John Wiley & Sons, 1987.

Knowledge bases may be built with one of two kinds of aids. One kind conducts an "interview" with an expert, asking the expert repeatedly for information. It builds up a relational structure from the expert's responses. These tools are called expertise-transfer systems. The other kind of aid is a structured editor or language that allows a trained knowledge engineer to easily add information to the knowledge base (or delete or modify the information). For example, such a system may allow the user to view, add, or remove a list of production rules, with the system checking the rules' syntax. There are several commercial expert system "shells" available that provide these capabilities.

Relatively simple expert systems can be constructed effectively using this second kind of tool and a production-rule format. An early expert system was the R1 family of knowledge-based systems. R1, later called XCON, is a domain-specific, rule-based expert system which solves a problem which is intractable using conventional data processing methods. The generation of a correct configuration of a computer system requires applying thousands of heuristic rules to capture the full variety of engineering components and relationships between the supported components. Human experts can apply these rules to generate a possible configuration, but there is no guarantee that the configuration will be correct, that is, that it can be manufactured and work properly. Furthermore, the goal of an optimal configuration solution may be beyond the capabilities of any human. R1 parses a customer's purchase order to determine what, if any, substitutions and additions of components have to be made to the purchase order to make it consistent and complete. It arrives at a solution by using its knowledge of the computer system configuration domain and of the peculiarities of the various configuration constraints.

The R1 system, developed by Carnegie Mellon University and Digital Equipment Corporation (DEC), is based on a production system model and written in OPS-5, a programming language particularly suited for production systems. The basic features of a production system as a knowledge representation are a global database containing the basic knowledge and the results of the computation so far, and a set of production rules that operate on the database. A production rule consists of a procedure called the body of the rule and an associated pattern. Inference processing in such a system consists of a cycle in which a rule s found whose pattern matches a portion of the database, and then the rule's body is executed. Execution of the body of a rule will generally make changes to the database by adding, deleting, or modifying data structures in the database. OPS-5 provides a simple, but uniform representation method for describing problem-solving state data and for specifying rule conditions that match this state data. However, OPS-5 provides little structure for representing facts, relationships, and uncertainty. Thus it does not provide a convenient general architecture for problem-solving. Additionally, to program the action components of rules, OPS-5 requires a knowledge engineer to write program code in a specialized programming language.

The R1 system had several drawbacks. Originally, it was specific to the VAX 11/780 computer system produced by DEC. Therefore it was a specialized configurator. Its capabilities have gradually been expanded to other DEC computer systems, but at the expense of adding more rules. As the number of rules expanded into the thousands, the system became slow. Some rules in the knowledge base were redundant. Because the configuration knowledge was based on rules, component constraint information was embodied in rules that were necessarily "hard-coded" by computer programmers from expert knowledge rather than written by an expert in a declarative fashion. Hence, performing maintenance and adding enhancements to R1 became very difficult as the system grew larger. The original R1 was not interactive; a user could not easily set up different, alternative configurations.

An expert system for configuring communications networks is disclosed in U.S. Pat. No. 5,175,800, issued to Galis, et. al. This invention allows a user to define and maintain databases of configuration knowledge and requirements information. The system validates the user's requirements or changes to requirements for a communications network and produces an expert configuration data set of options for full and partial configuration efforts. The system is rule-based, the embedded rules specifying the legal connections between network devices. Hence it is susceptible to the same kinds of problems as the R1 system. The Galis, et. al. system is a special purpose configurator. It is designed primarily for communications networks including time division multiplexing (TDM) devices. Its man machine interface guides the user to enter data and commands to make configuration decisions for a communications network. The special purpose nature of this invention restricts its application to communications network configuration problems.

An expert system for designing a connected collection of components which may be described by variable characteristics is disclosed in U.S. Pat. No. 5,293,479, issued to Quintero, et. al. This invention includes a knowledge base and an inference engine. The knowledge base includes information relating to constant and variable characteristics of the connectable components and rules for combining these components. The inference engine interprets the rules in order to legally connect the components per user requests. The Quintero, et. al. system exhibits flaws similar to the R1 and Galis, et. al. systems, in that it is rule-based and directed to a specialized problem domain (in this case, modular furniture assembly).

Several existing special purpose configurators take different approaches to solving the configuration problem for computer systems. One system, used specifically for the 2200 Series computer systems produced by Unisys Corporation, employs large portions of iterative code and specialized data structures to represent the large variety of system components available and to solve component cabling (or "stringing") problems. Another system, for the "A" Series computer systems sold by Unisys, also uses specialized data structures written in a standard high level language to represent components, which are manipulated to solve component packing problems. Its packing logic modules execute in predefined sequences, with no dynamic ordering. Consequently, it sometimes produces anomalous cases of very poor results. A third system for configuring personal computer (PC) systems is based on the concept of a spreading activation network. This system works effectively for simple configurations, but as the complexity level grows, the spreading activation network becomes too convoluted to be processed properly. Each of the above approaches requires major program code modifications to change the way components can be connected, add or delete possible system components, or support other models of computer systems.

A product configurator tool based on an object-oriented design methodology is commercially available from the Trilogy Development Group. In the Trilogy configurator, called "SalesBuilder," each part or component to be configured is represented by a software object. Thus, knowledge in this system is based on objects and not rules. The Trilogy system uses an underlying Structured Query Language (SQL) database manager to develop a customized product configuration system, which is then used by a company as a sales and marketing tool. This system is implemented in the C++ programming language in order to take advantage of the available features of hierarchy or objects and class inheritance. The object-oriented design approach works well for relatively small configuration problems, such as for a PC, but is insufficient for the complex configurations inherent in large mainframe computer systems.

A flexible, generalized configurator is needed to manage the various levels of complexity for configuration problems. Many products which are composed of a large number of interconnected parts undergo continuous change in their product set and packaging. Keeping up with the constant state of flux of product lines is a difficult and time-consuming task for a large number of users. Special purpose expert systems, often using special databases, can address parts of this configuration problem, but they occasionally create results that are obviously sub-optimal, or are limited to subsets of the total problem. Such systems also impose a major maintenance burden. Therefore, a generalized configurator should be easily defined and modified. Previously installed configurations often have a long life, yet customers of a particular product have the need from time to time for replacement components that may or may not be currently manufactured. Thus, the configurator must support historical data to allow for old, legacy components. There is usually widely varying expertise among configurator users, so a configurator should be able to provide "manual" control for experienced users and an automatic mode for novice users. Finally, the sheer complexity of the configuration problem may demand automatic answers to problems too complicated for humans to adequately and efficiently solve.

SUMMARY OF THE INVENTION

An object of this invention is to generate a complete, near-optimal, legal configuration of a complex system consisting of many interconnected components.

Another object of the present invention is to generate a complete, near-optimal, legal configuration of components for a complex computer system.

Yet another object of this invention is to provide a generalized configurator that is easily particularized to solve configuration problems for a variety of complex systems composed of multiple interconnected components.

Another object of the present invention is to provide a generalized configurator that is easily particularized to solve configuration problems for a variety of computer systems.

Still another object of the present invention is to integrate existing packing-based and network-based information processing system configurators into a generalized, comprehensive configurator expert system, thereby uniformly supporting a complete range of required functionality.

Yet another object of this invention is to provide a generalized configurator which is easier to particularize, modify, and maintain than existing configurator expert systems.

Still another object of this invention is to provide a generalized configurator whose user interface is flexible, easy to use, and independent of the configurator's internal configuration logic.

A further object of this invention is to provide a configurator developer with a declarative language with which to define how various components in a complex system may be connected.

Another object of the present invention is to furnish an efficient underlying run-time representation of configuration knowledge for supporting automatic configuration of computer system components.

Still another object of this invention is to use a two-level, bi-partite, spreading activation graph as a declarative description of the components to be configured by a configurator expert system so as to enhance ease of use, broaden the scope of configurator applicability, and minimize maintenance costs.

Yet another object of the present invention is to support the saving and loading of configuration knowledge.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended claims.

According to the present invention, the foregoing and other objects and advantages are attained by a generalized configurator which uses declaratively constructed graphs and multiple interacting packers. The invention implements the fundamental processing and representation that is required to build generalized configuration tools. Without the general capabilities provided by the present invention, it is extremely difficult to build a generic, interactive configurator that permits the easy definition of the configuration process for a wide range of types of assembly, and allows both manual control of the details of a configuration and also automatic handling of any details the user chooses not to control.

The present invention uses a bi-partite graph and associated syntax to provide a well-structured, integrated way to describe the components that are part of a given configuration process, and to track detailed configuration request made by a user. The configurator disclosed herein uses an explicit, separate representation of individual packing objects for each component for which packing is needed. A general control paradigm is shown which allows these packers to interact constructively to produce legal, near-optimal configurations under widely varying circumstances. This approach constitutes a significant advance from previous situations where a fixed sequence of packing processes is performed. The present invention also discloses an expression grammar to specify the constraint parameters that define configuration legality. The embedded functionality to handle these constraint expressions improves the development and maintenance process of configurator expert systems.

In accordance with an aspect of this invention, an expert system for generating a valid configuration of connected components comprises an a priori database for storing component definitions declaratively specified by the system developer (known as the configurator developer). An instance database is provided to store instances of components defined in the a priori database that are interactively selected by a user of the expert system (known as the configurator user). The expert system accepts requests from the configurator user to configure and connect selected components, matches the requests to component definitions stored in the a priori database, and creates and connects the instances of the selected components if the creation and connection of the instances are valid. The validity check is based on the component definitions in the a priori database and prior configurator user requests that have already been processed. The instance database is the representation of the valid configuration resulting from the implementation of the configurator user requests. The processing unit reports this valid configuration to the configurator user via a graphical user interface.

In accordance with another aspect of the invention, a method of generating a complete, valid, near-optimal configuration of connected components, wherein each component can be described by a component definition, comprises the steps of allowing a configurator developer to declaratively define components; representing the component definitions and the resources implied by their use as nodes in a first, bi-partite, spreading activation graph; and accepting requests from a configurator user to configure and connect the selected components. The last step in the method involves creating and connecting instances of the selected components and the resources defined in the first, bi-partite, spreading activation graph as nodes in a second bi-partite graph if the creation and connection of the instances is valid based on the component definitions, on previous configurator user requests, and on the current state of the second bi-partite graph.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS

FIG. 2 is an illustration of the basic syntax of the External Form for an Item.

FIG. 3 is an example of an External Form description.

FIG. 12 is an example of the display of a Data Entry Form.

DESCRIPTION OF THE PREFERRED EMBODIMENT

Table of Contents

Figure 1:
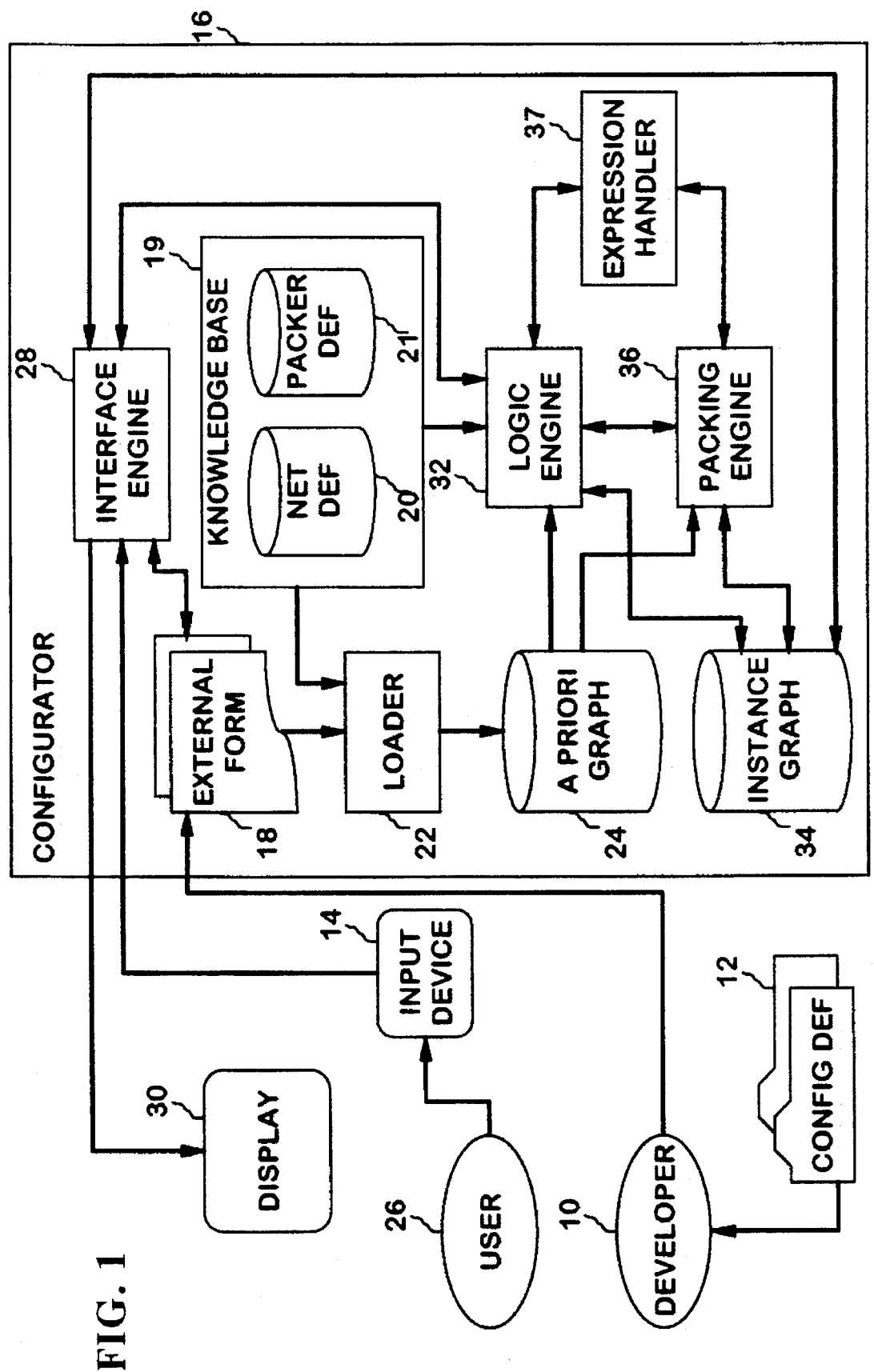
FIG. 1 is block diagram illustrating the main logical components of the present invention.

I. OVERVIEW OF THE PRESENT INVENTION
II. THE TWO-LEVEL BI-PARTITE GRAPH
III. A SIMPLE EXAMPLE
IV. KNOWLEDGE BASE DEFINITIONS
  A. Net Definition
  B. Packer Definition
V. THE LOADER
VI. THE LOGIC ENGINE VII. THE PACKING ENGINE
A. Packer Processing
B. The Selecting Proposer
C. The Assigning Proposer
D. The Consultant
E. The Implementer
F. The Master Scheduler
G. A Packing Example
VIII. CONSTRAINT EXPRESSIONS AND THE EXPRESSION HANDLER
A. A Constraint Expression Example
B. Functions Supported By The Expression Handler
IX. THE INTERFACE ENGINE
A. Data Entry Forms
B. Capsules
X. PERSISTENT INFORMATION
APPENDIX A. EXTERNAL FORM SYNTAX DEFINITION
APPENDIX B. EXTERNAL FORM EXAMPLE
APPENDIX C. GLOSSARY

I. OVERVIEW OF THE PRESENT INVENTION

The preferred embodiment of the present invention provides a generalized framework for solving complex computer system configuration problems. Alternatively, the concepts embodied herein could be used by those skilled in the art to solve a variety of component assembly and system definition problems. The general nature of the configurator and associated configuration specification language disclosed herein provides a foundation for solving configuration problems for any produce composed of multiple, interconnected components. The initial implementation of this invention was written in the Common LISP programming language. This implementation utilizes an expert system shell called the Knowledge Engineering Environment (KEE), commercially available from Intellicorp, Incorporated. However, the concepts embodied in the present invention could also be implemented in other symbolic or object-oriented languages such as C++, utilize other operating systems such as WINDOWS by Microsoft Corporation, and be executed by a wide variety of processors.

The underlying AI paradigm of the present system is a two-level, bi-partite graph. This graph is used to represent the configuration information. The graph is defined as a network of components and relationships. It is defined with a declarative syntax; a form of syntax in which definitions are given in terms of state rather than in terms of process. This allows a configurator developer to avoid having to define the sequential logic of steps to solve a configuration problem. As components of the system being configured are defined, instances of these components are created in the second level of the graph. The requirements and values of the components being defined flow through the first level of the graph. The way the first level of the graph is used in the present system resembles the concept of spreading activation for semantic networks. Spreading activation is a control paradigm in which processing starts at some node in a graph and travels from there to the nodes directly connected by arcs to the starting node, and from there to the next set of directly connected nodes, and so on. In a semantic network, each node within the network usually has some functional processing attached to it, which "fires" (i.e., performs processing) as logical control flows through the network. In the present system however, nodes in the first level of the graph do not necessarily have functional processing attached to them. Furthermore, the spreading in the first level of the graph is strictly controlled. The representation of knowledge in the present system is not based on rules as in many other expert systems, but on the bi-partite graph. The rule-based system paradigm is satisfactory for a relatively simple problem domain but quickly becomes unworkable for a large, complex problem domain such as computer system configuration. However, the bi-partite graph works equally well for large or small configuration problems.

FIG. 1 is a block diagram illustrating the main logical components of the present invention. A configuration system Developer 10 defines the configuration items and resources available for a given set of computer systems by referencing Configurator Definition information (CONFIG DEF) 12 and inputting it to the Configurator system 16. In the preferred embodiment, the Developer 10 uses a new special-purpose language to create a specific implementation of the Configurator 16 for the available devices and components of a particular computer system. Alternatively, the Developer could describe other complex systems composed of many components such as communications networks, transportation systems, and the like. The Configurator Definition 12 contains information about the problem domain. For example, in the computer system configuration problem domain, the Configurator Definition will contain information on available system components such as cabinets, backplanes, input/output (I/O) channels, power supplies, peripheral devices, etc., plus the requirements for interconnecting these components, and the limitations on their use. This information is entered by the Developer 10 into a test-based External Form 18. Note that the Configurator Definition 12 is defined declaratively by the Developer and is stored in the External Form file. The Developer 10 may easily change the definition of the Configurator by editing this file using any available test editor computer program. There is no need for re-programming the Configurator 16 when new components are available, old components are retired, or when the relationship between existing components undergoes revision. Therefore, maintenance of the present system is significantly easier than maintenance of a large rule-based expert system.

The Configurator contains a database called the Knowledge Base 19. The contents of the Knowledge Base 19 define the types of constructs that may be manipulated by the Configurator. The Knowledge Base 19 contains two separate databases. The first is the Net Definition (NET DEF) 20. The Net Definition defines what types of objects may be represented in the External Form 18. The second database is the Packer Definition (PACKER DEF) 21. The Packer Definition defines what types of packing logic objects may be referenced within the External Form 18. Further details on the Knowledge Base 19 are provided below in Section IV.

The External Form 18 is parsed and translated by a Loader module 22 into a graph-based internal form called the "A Priori" Graph 24. The Configurator 16 is then delivered to end users. The External Form is also delivered to end users to allow them to modify possible configurations. Subsequently, a Configurator User 26 initiates processing of the Configurator 16 via Input Device 14. The User 26 operates the Configurator 16 to generate a solution to a particular configuration problem for computer systems (or other complex systems defined by the Developer) supported by this Configurator. As Interface Engine 28 provides a graphical user interface (GUI) on Display 30 for selecting components to configure. The Interface Engine 28 accepts User input selections through Input Device 14 and displays resulting system configuration information and status on the Display 30. The Input Device 14 may be a keyboard, mouse, or other suitable device for obtaining input from a user.

The Interface Engine 28 instructs a Logic Engine module 32 to create and interconnect instances of selected system components for the current configuration. An instance is a particularized copy of a component that exists in the A Priori Graph 24. A component in this context is an identifiable object (often a piece of hardware) that must be ordered and/or influences the configuration process. A completed configuration consists of the collection of components needed to satisfy a User's requests, plus their interconnections. The Logic Engine 32 creates a graph made up of Instances (the Instance Graph) 34. The information in the A Priori Graph 24 is used as a template for creating each selected component's Instance. The set of Instances and their interconnections defines the current state of the configuration. When each User selection is made, it adds a component to the configuration and the Logic Engine 32 propagates the required values in the graph. That is, the Logic Engine transverses the newly modified A Priori Graph 24 and attempts to find a solution to the configuration problem based on the User's component selections processed so far and their accompanying implicit constraints. The propagation stalls at some nodes within the Graph that are called "packing" nodes. Packing nodes require additional logic to be processed in order to correctly solve the configuration problem because of the inter relatedness of constraints for different nodes in the graph. Packing Engine 36 resolves these conflicts to arrive at a solution, which is presented back to the User 26 by the Interface Engine 28 for review. Packing Engine 36 and Logic Engine 32 utilize the capabilities of Expression Handler 37 in evaluating constraint or other expressions specific to nodes in the A Priori Graph 24. The configuration resulting from this propagation and packing process is near-optimal. It is satisfactory in that it is guaranteed to work when assembled because the Configurator 16 arrived at the solution by assessing all possible Developer-defined constraints on the use of the selected components. The solution may not be ideal, but it avoids all obvious problems and is generally better than most humans could easily achieve.

II. THE TWO-LEVEL BI-PARTITE GRAPH

A bi-partite graph is used to represent the knowledge in the Configurator 16. A graph is a network of nodes interconnected by arcs. In the preferred embodiment of the present invention, these arcs are bi-directional. This graph is the primary storage mechanism (i.e., data structure) for all information relating both to the definition of a configurator, and to a specific configuration. In the present system, nodes are shown in graphical form as rectangles or ovals and arcs as the lines connecting them. "Bi-partite" means that there are two different kinds of nodes in the graph such that every arc joins a node of one type to a node of the other type. A complex configuration is largely specifiable in terms of components that supply and/or consume capabilities of other components. These components are linked together in various ways to form the graph that represents both the Configurator logic and the current configuration. The use of a bi-partite graph creates a view of the configuration problem that is characterized by a network of "Items" and "Resources" with attached "Constraint Expressions." An Item is a node in a graph representing a component. A Resource is a capability supplied or consumed by Items that is not itself a component, but which influences the configuration of components. Items are physical components that provide particular features of the configurable assembly; they generally depend on the support of other Items, in that these other Items supply or consume some quantity of Resources that the former Items need or provide. For example, in configuring a digital computer system, a card cage (Item) provides a number of slots (Resources) that cards (Items) can plug into. Hence, the bi-partite graph consists of alternating Items and Resources, interconnected to reflect the supplies/consumes dependencies and quantities. These Items and Resources are implemented as "objects" in software terms. They have names and are connected together by specifying the names of other objects that they are directly related to. Both Items and Resources have properties that identify values of local interest.

The use of a two-level graph partitions the definition of a Configurator 16 from the content of a specific configuration, while maintaining consistency between the two sets of information. At the first level, each Item or Resource is given a unique name by the Developer 10 of the graph. This graph can be crated by a Developer in a declarative syntax, largely by specifying explicitly the Items that are to exist, and specifying explicitly or implicitly the Resources that connect them. Items and Resources may also have Properties, which are names with associated changeable values that can be used to attach specialized local information, and Items can contain Constraint Expressions that define relationships more complex than can be expressed in simple supplies/consumes terms. Constraint Expressions are written using a grammar of functions that reference only Item and Resource names. A Constraint is a limitation on the generality with which components can be configured. A single Constraint may involve several components, a single component may have several Constraints, and multiple Constraints on one or more components can interact in complex ways. Constraints are used by the Packing Engine 36 to determine the validity of the impact of a User's request on the Instance Graph 34. A grammar is a set of rules that define how elements of a language can be combined. An Expression Grammar defines how primitive values and functions can be combined into legal expressions. The existence of a declarative grammar creates the possibility of describing computation in the Configurator in a way other than by static program code. By writing Constraint Expressions in an Expression Grammar and attaching them to Items, a Developer can accurately represent the relationships between Items.

The first level of description defines the structure of a Configurator for a specific computer system in terms of the types of components that can be configured and their interdependencies. It is supported by the Loader 22, which converts the syntactic form of the Configurator Definition 12 (namely, the External Form 18), which consists primarily of the Items and their characteristics, into the internal form of the A Priori Graph 24, in which all Items and Resources and their interconnections are explicitly represented. This loaded definitional form of the graph constitutes the "A Priori" level of the information used by the Configurator 16 as the configuration process progresses. No changes are made to the A Priori level during a User's execution of the Configurator; it is used to direct the spreading activation when a User configures a component. It should be understood that the A Priori Graph 24 is not monolithic; it could consist of a collection of graphs contained in separately loadable files. For example, one file may contain the graph that defines the main components of a computer system. Another file may contain the definitions of peripheral devices available for connection to the computer system. Various communications devices may be obtained from a third file, and so on.

The specific configuration being built is represented at the second level by a similar graph, containing User selections from the same Items and Resources, but with each Item or Resource replicated the number of times needed to satisfy the User's requests (rather than everything being present, but only one, as in the A Priori Graph). This is the "Instance" level of the graph, each needed component being "instantiated" there an appropriate number of times. Instances are connected to the corresponding nodes in the A Priori Graph by two-way linkage. An Instance is also connected to all Instances it depends on, or that depend on it. These connections are expressed in terms of the names of the connected objects or pointers to them. A two-way linkage is a pair of connections between two objects such that it is straightforward to find either from the other one. Note that an Instance always corresponds to exactly one Item or Resource at the A Priori level, but a single A Priori level Item or Resource can have many corresponding Instances. At this level, the Item Instances are still generally connected to the Resource Instances in the same way as at the A Priori level, but each Instance is connected to exactly and only those other Instances that it is itself dependent on. Hence, the Instance level directly represents the assembly that may ultimately be manufactured and delivered, with components interconnected as they will be in the final system. The interconnected Instances are, in essence, the configuration. The Instance level provides the basis for pricing, quoting to customers, ordering, and manufacturing the system that has been configured.

FIG. 2 is an illustration of the basic syntax of the External Form for an Item. The Item statement 38 specifies the Item name and begins the Item declaration. The Consumes statement 40 specifies the quantity of the named Resources consumed by the Item. The Supplies statement 42 specifies the quantity of the named Resources supplied by the Item. The Constraints statement 44 specifies the constraints that apply to the configuration of the Item. If multiple constraints are specified, all of the listed constraints must be satisfied for each Instance of the Item. The Property statement 46 specifies attribute values for the Item. A Configurator Developer 10 is free to define Property names to satisfy Configurator 16 needs. Property values can be numbers or strings of characters. The EndItem 48 token signifies the end of the Item's definition. There may be multiple Property, Supplies, and Consumes statements in an Item definition.

The complete definition of the External Form syntax is shown in Appendix A. A sample External Form for the A Series computer system produced by Unisys Corporation is shown in Appendix B.

III. A SIMPLE EXAMPLE

Figure 4:
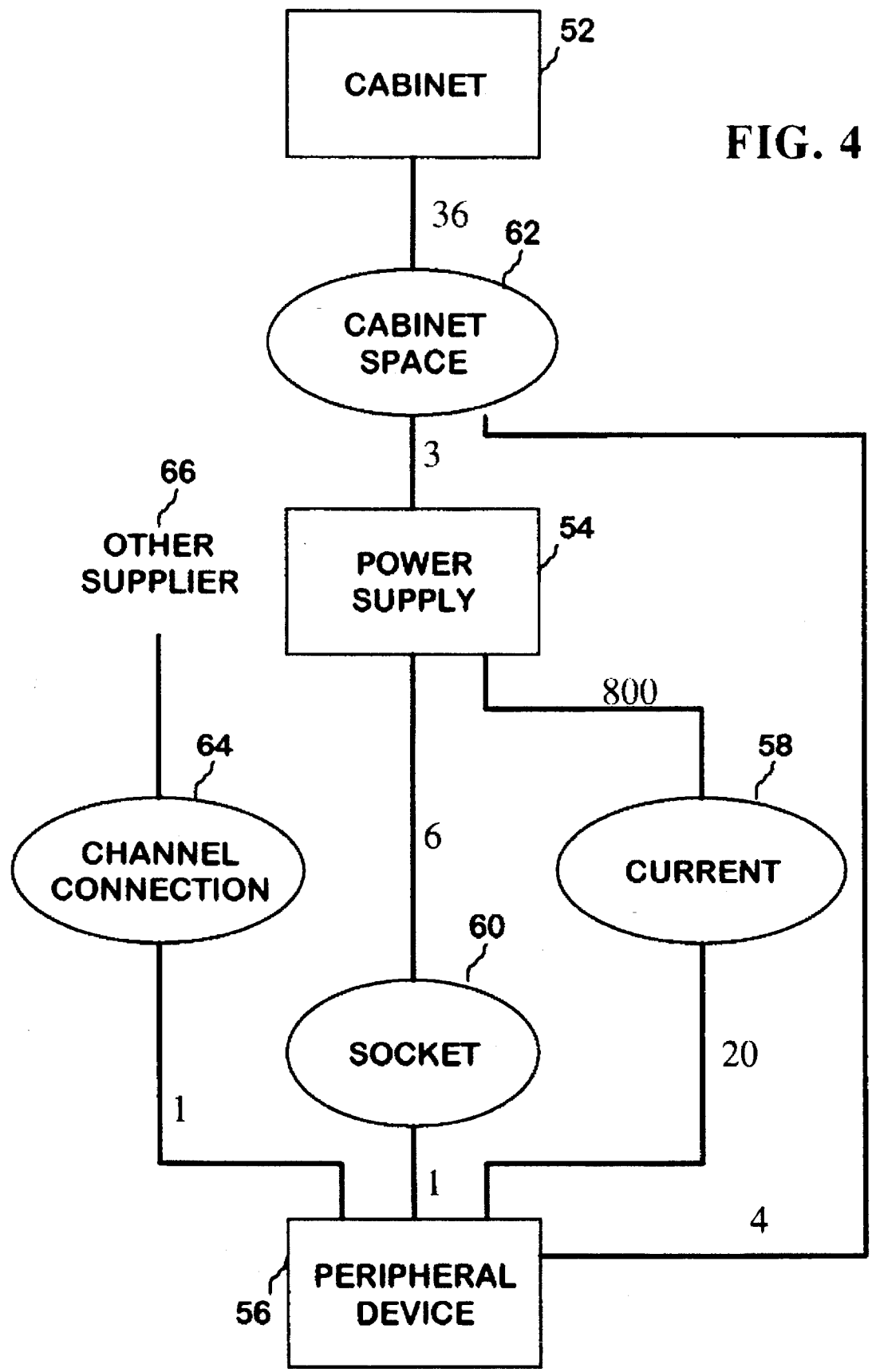
FIG. 4 is a diagram of the A Priori Graph resulting from the External Form example.

To illustrate the graph that results from this representation in configuring a digital computer system, consider FIG. 3 and FIG. 4. FIG. 3 is an example of an External Form description. It shows the sample syntactic External Form 50 that a Configurator Developer 10 would write to define a cabinet, a power supply, and a peripheral device, and the relationships between these components. In the example shown, a cabinet Item 52 supplies 36 units of storage Resources, of which the middle group (roughly at waist height) provides convenient access for the human computer system operator. A power supply Item 54 consumes 3 units of cabinet space, and supplies 6 sockets and 800 deci-amps of current. A peripheral device Item 56 (which may be a disk drive, tape drive, etc.) consumes 20 deci-amps, one socket, one channel connection and four units of cabinet space. FIG. 4 is a diagram of the A Priori Graph resulting from the External Form example. The A Priori Graph shows a Peripheral Device 56 that needs the resources Current 58 and Socket 60 from a Power Supply 54, some Cabinet Space 62 from a Cabinet 52, and a Channel Connection 64 to some Other Supplier 66 (which is not further addressed in this example). The Power Supply 54, in turn, consumes Cabinet Space 62. The numbers on the connecting arcs represent typical amounts of the Resources (in various units) that might be supplied or consumed by the Items.

Figure 5:
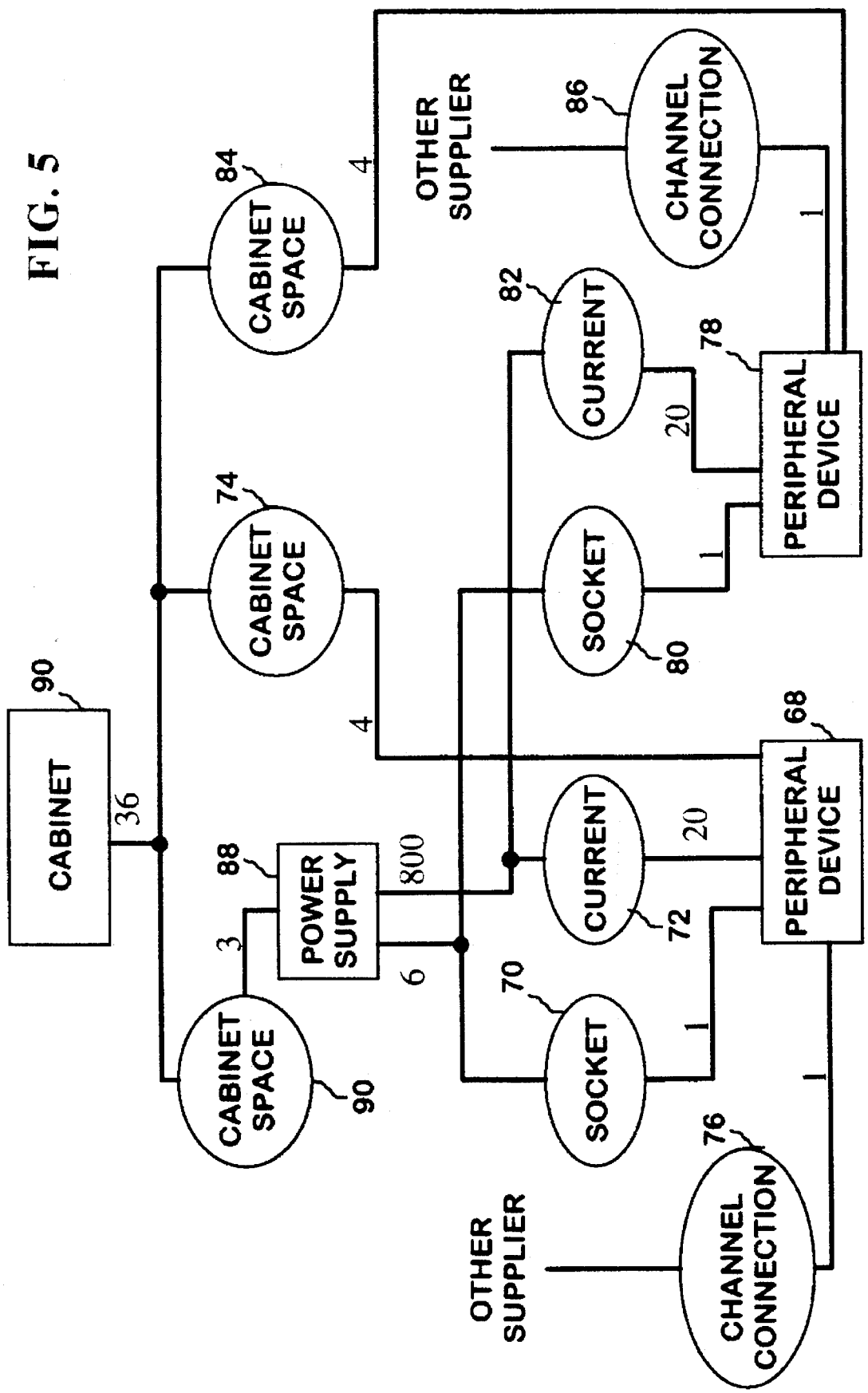
FIG. 5 is a diagram of the Instance Graph.

If the Configurator User 26 operating the resulting Configurator 16 wanted to configure two peripheral devices into a computer system based on this A Priori Graph, a corresponding Instance Graph would be created. FIG. 5 is a diagram of the Instance Graph. The first Peripheral Device 68 requires a Socket 70, Current 72, Cabinet Space 74, and a Channel Connection 76. The second Peripheral Device 78 likewise requires a Socket 80, Current 82, Cabinet Space 84, and a Channel Connection 86. Both Peripheral Devices are supplied with a socket and current by a Power Supply 88. The two Peripheral Devices 68, 78 and the associated Power Supply 88 all consume cabinet space supplied by the Cabinet 90. Notice that the Cabinet 90 supplies 36 units of space and each of the two Peripheral Devices consumes 4 units, and the Power Supply 88 consumes 3 units. If the User 26 selects a component that causes the available space for a cabinet to be exceeded, for example, the Configurator 16 automatically creates a new instance of an additional cabinet item. Similar processing would occur if too many devices were connected to Power Supply 88, thereby exceeding its supply of sockets or current.

Note that when an Item consumes more than one Resource that some other single Item supplies, one Instance of the supplying Item must normally supply all of those Resource Instances to an Instance of the consuming Item.

In simple cases the configuration implications of User requests can be derived directly by spreading activation; that is, by allowing control to flow through the A Priori Graph from the node representing the requested component to the nodes that represent the additional components whose need is implied by that request. This flow can be made to cause creation of an Instance of any node traversed that is not already available for the current usage in the Instance Graph, and to make connections between the Instances, both new and old, that represent the response to the new request. If, for instance, in the A Priori Graph illustration of FIG. 4, the Power Supply 54 rested on the floor rather than being housed in a cabinet, then a request for a peripheral device would imply no more than requirements for cabinet space and for any socket able to supply the needed amount of current. Once a configuration session has begun, a cabinet and power supply will very likely already have been instantiated for other reasons, and whether to configure a new cabinet or power supply (if no capacity is left) or to use the facilities of one(s) already configured, could be determined directly from the two levels of the graph by moving from the requesting node to those connected to it.

Once interactions arise between configuring a needed power supply into a cabinet and configuring the device that needed it into that cabinet, it becomes necessary to do more than simple spreading activation in the A Priori Graph. Assuming a peripheral device and its power supply must be in the same cabinet, then placing the device into the cabinet might not leave enough space for a new power supply, if one is needed. Deadlock or premature failure can arise unless the interaction is addressed. Deadlock is the situation in which one activity has acquired some capability A and needs capability B, and another activity has acquired capability B and needs capability A. No further work will be done by these activities until one or both relinquish the capability required. This is a very simple example of a problem that can arise in many areas simultaneously—e.g., a peripheral device requires not only power and cabinet space, but also connection to an I/O channel; this channel might be limited in the number of device addresses it could support, and the devices on the channel would need to be cabled together. The cabling in turn might impose minimum and maximum cable length constraints. In such a situation there is no single processing sequence that will always produce a satisfactory result; it is necessary to dynamically choose the most appropriate piece of the problem to address next, and to look ahead to explore the consequences of choices tentatively made. This complexity is compounded by the impact that the sequence in which the User makes selections has on the quality of the final configuration, which implies that it should be possible to "repack" all requested components at arbitrary times to achieve the best possible fit. Repacking removes from the Instance Graph all Instances that were not directly requested by the User and re-executes the propagation and packing of the remaining instances to produce a new configuration. The repacking process normally produces a more optimal configuration because of the freedom the Configurator has to choose the sequence in which Instances are processed. However, in order to do this, it is necessary (in a sequential machine) to select the components for processing in some sequence, but there is no single set of ordered criteria in terms of which to make these selections. The Packing Engine 36 described in Section VII solves both of these problems in an integrated manner.

IV. KNOWLEDGE BASE DEFINITIONS

The Knowledge Base 19 is composed of two distinct sets of information, the Net Definition 20, and the Packer Definition 21.

A. Net Definition

The Net Definition 20 is a definition of what kinds of data objects may be defined in the A Priori Graph 24. It lists the underlying data structures manipulated by the Logic Engine 32. The Net Definition may define objects such as Items, Resources, Modules, Item Sets, Resource Sets, and Groups. The Net Definition is set up to support configuration of particular kinds of complex systems. In the initial implementation of this invention, the Net Definition was defined by using the KEE expert system shell available from Intellicorp, Inc. However, objects in the Net Definition could also be implemented as C++ class definitions.

B. Packer Definition

The Packer Definition 21 is a definition of what kinds of packers can be attached to Items in the A Priori Graph. The following table shows a portion of a sample Packer Definition 21 for the preferred embodiment implemented in the LISP programming language and using the KEE expert system shell. It supports configuration of an A Series computer system available from Unisys Corporation. A basic packer is defined at the outset. Packers for components such as cabinets, Power Distribution Units (PDUs), Channel Access Managers (CAMs), Channel Manager Units (CMUs), and bases are defined. A packing control packer is defined to specify the control aspects of interacting packers. Chain and length checking packers are also defined. Finally, length packers are defined for Small Computer Interface (SCSI) and Intelligent Peripheral Interface (IPI) interfaces.

```
© 1994 Unisys Corporation
;;; -*- Mode:Common-Lisp; Syntax:Common-lisp; Package:KEE; Base: 10. -*-
(PACKERS NIL
(KNOWLEDGEBASES) NIL () ((KBMETHODFILE("PACKERS"))
(KBSIZE (21))
(KEE.DEVELOPMENT.VERSION.NUMBER (0))
(KEE.MAJOR.VERSION.NUMBER (3))
(KEE.MINOR.VERSION.NUMBER (1))
(KEE.PATCH.VERSION.NUMBER (23.2))
(KEEVERSION (KEE3.1)) ))
(PACKING.OP
    ((ENTITIES GENERICUNITS))
    ((CLASSES GENERICUNITS))
    "Basic packing operation class. Each operation is a member of this class."
    ((ASSIGNING.PROPOSER (PACKING.OP.ASSIGNING.PROPOSER) METHOD
        (#[Unit: METHOD KEEDATATYPES]) NIL
        ((COMMENT ("Assigning Proposer Method"))))
    (ASSIGNING.PROPOSER.STRATEGIC
        (PACKING.OP.ASSIGNING.PROPOSER.STRATEGIC) METHOD
        (#[Unit: METHOD KEEDATATYPES]) NIL
        ((COMMENT ("Assigning proposer that assigns according to the order
        determined by strategy.measure.assigning when present"))))
    (CONSTRAINED.MEASURE (PACKING.OP.CONSTRAINED.MEASURE)
        METHOD (#[Unit: METHOD KEEDATATYPES]) NIL
        ((COMMENT ("Returns the measure of constrainedness associated with the
        placement of a particular resource"))))
    (CONSTRAINT.MONITOR NIL NIL NIL NIL
        ((COMMENT ("Used to monitor the frequency with which a particular constraint
        failed."))))
    (CONSULTANT (PACKING.OP.CONSULTANT) METHOD
        (#[Unit: METHOD KEEDATATYPES]) NIL ((COMMENT ("Consultant
        Method"))))
    (CONSULTING.OPS NIL NIL NIL NIL
        ((COMMENT ("The operations (excluding this one) who must have their
        consultants called when this operation makes an assignment."))))
    (DEQUEUE (PACKING.OP.DEQUEUE) METHOD
```

```
                    (#[Unit: METHOD KEEDATATYPES]) NIL
                    ((COMMENT ("dequeue method"))))
            (DOER (PACKING.OP.DOER) METHOD
                    (#[Unit: METHOD KEEDATATYPES]) NIL
                    ((COMMENT ("Doer Method"))))
            (ENQUEUE (PACKING.OP.ENQUEUE) METHOD
                    (#[Unit: METHOD KEEDATATYPES]) NIL
                    ((COMMENT ("enqueue method"))))
            (ITEM NIL NIL NIL NIL
                    ((COMMENT ("The apriori item this is the packer for"))))
            (QUEUE (NIL) NIL NIL NIL
                    ((COMMENT ("list of resource instances needing pack"))))
            (SELECTING.MEASURE (PACKING.OP.SELECTING.MEASURE) METHOD
                    (#[Unit: METHOD KEEDATATYPES]) NIL
                    ((COMMENT ("Returns some combination of the constrainedness measure and
                    strategy measure"))))
            (SELECTING.PROPOSER (PACKING.OP.SELECTING.PROPOSER) METHOD
                    (#[Unit: METHOD KEEDATATYPES]) NIL
                    ((COMMENT ("Selecting proposer method"))))
            (STRATEGY.MEASURE.SELECTING
                    (PACKING.OP.STRATEGY.MEASURE.SELECTING) METHOD
                    (#[Unit: METHOD KEEDATATYPES]) NIL
                    ((COMMENT ("Returns the measure of strategy associated with the placement of
                    a particular resource"))))
            (UNDOER (PACKING.OP.UNDOER) METHOD
                    (#[Unit: METHOD KEEDATATYPES]) NIL
                    ((COMMENT ("undoer method"))))
    ) ())
(IPI.CABLING.OP NIL
        (CHAINPACKING.OP) NIL ()
        ((CONSTRAINT.MONITOR (NIL))
        (ITEM (IPI.CABLE))
        (LENGTH.PACKER (IPI.LENGTH.OP))
        (QUEUE ((NIL))) ))
(CABINETPACKING.OP NIL
        (PACKING.OP) NIL ()
        ((ASSIGNING.PROPOSER (PACKING.OP.ASSIGNING.PROPOSER))
        (CONSTRAINED.MEASURE (PACKING.OP.CONSTRAINED.MEASURE))
        (CONSTRAINT.MONITOR (NIL))
        (CONSULTANT (PACKING.OP.CONSULTANT))
        (DECOMPOSITION.DISJOINT)
        (ITEM (CABINET))
        (MEMBERS.DATATYPE)
        (MEMBERSHIP)
        (QUEUE ((NIL)))
        (SUBCLASSP) ))
(PDUPACKING.OP NIL
        (PACKING.OP) NIL ()
        ((ASSIGNING.PROPOSER (PACKING.OP.ASSIGNING.PROPOSER))
        (CONSTRAINED.MEASURE (PACKING.OP.CONSTRAINED.MEASURE))
        (CONSTRAINT.MONITOR (NIL))
        (CONSULTANT (PACKING.OP.CONSULTANT))
        (ITEM (PDU))
        (QUEUE ((NIL))) ))
(CAMPACKING.OP NIL
        (PACKING.OP) NIL ()
        ((CONSTRAINT.MONITOR (NIL))
(ITEM (CAM))
(QUEUE ((NIL))) ))
(CMUPACKING.OP NIL
        (PACKING.OP) NIL ()
        ((CONSTRAINT.MONITOR (NIL))
(ITEM (CMU))
(QUEUE ((NIL))) ))
(BASEPACKING.OP NIL
        (PACKING.OP) NIL ()
        ((ASSIGNING.PROPOSER (PACKING.OP.ASSIGNING.PROPOSER))
        (CONSTRAINT.MONITOR (NIL))
        (CONSULTING.OPS ((CMUPACKING.OP)))
        (ITEM (BASE))
        (QUEUE ((NIL)))
        (STRATEGY.MEASURE.ASSIGNING
(BASEPACKING.OP.STRATEGY.MEASURE.ASSIGNING) METHOD
                    (#[Unit: METHOD KEEDATATYPES])))
))
(PACKCONTROL
        ((ENTITIES GENERICUNITS))
        ((CLASSES GENERICUNITS))
        "Home of Supervisor, MasterConsultant"
        ((DEQUEUE.PARTIAL.WORK (PACKCONTROL.DEQUEUE.PARTIAL.WORK)
```

```
                    METHOD (#[Unit: METHOD KEEDATATYPES]))
        (ENQUEUE.PARTIAL.WORK (PACKCONTROL.ENQUEUE.PARTIAL.WORK)
                    METHOD (#[Unit: METHOD KEEDATATYPES]))
        (FORCE.ENQUEUE (NIL) NIL NIL NIL
                    ((COMMENT ("A boolean that is true if dequeue and enqueue operations are to
                    use forced.partial.work rather than partial.work"))))
        (FORCED.PARTIAL.WORK ((NIL)) NIL NIL NIL
                    ((COMMENT ("List of work that must be done that is immune to early cut off
                    (maxdepth and maxbreadth)"))))
        (KEEPLOOKAHEADS (NIL) NIL NIL NIL
                    ((COMMENT ("T if we are to keep the look ahead assignments, NIL
                    otherwise"))))
        (MASTERCONSULTANT (PACKCONTROL.MASTERCONSULTANT) METHOD
                    (#[Unit: METHOD KEEDATATYPES]))
        (MASTERCONSULTANT.DEPTH (0) NIL NIL NIL
                    ((COMMENT ("Number of look aheads we've already done"))))
        (MASTERCONSULTANT.MAXBREADTH (1000) NIL NIL NIL
                    ((COMMENT ("Number of partial tasks masterconsultant should pick from first in
                    its attempt to look ahead"))))
        (MASTERCONSULTANT.MAXDEPTH (3) NIL NIL NIL
                    ((COMMENT ("Max number of look aheads allowed"))))
        (PACKER.ORDER ((((CAMPACKING.OP CMUPACKING.OP IPI.CABLING.OP
                    IPI.LENGTH.OP SCSI.CABLING.OP SCSI.LENGTH.OP BASEPACKING.OP
                    PDUPACKING.OP CABINETPACKING.OP))))
        (PACKINGP (NIL) NIL NIL NIL
                    ((COMMENT ("Determines whether we are currently in the midst of a pack"))))
        (PARTIAL.WORK ((NIL)) NIL NIL NIL
                    ((COMMENT ("List of work that must be done that is related to work that has
                    already been done"))))
        (RECALC.FREQ (1) NIL NIL NIL
                    ((COMMENT ("Number of assignments that the supervisor should make before all
                    packers' selecting proposers should recalculate their values."))))
        (REGISTERED.OPS ((CAMPACKING.OP CMUPACKING.OP IPI.CABLING.OP
                    IPI.LENGTH.OP SCSI.CABLING.OP SCSI.LENGTH.OP BASEPACKING.OP
                    PDUPACKING.OP CABINETPACKING.OP)) NIL NIL NIL
                    ((COMMENT ("list of registered packing.ops"))))
        (SUPERVISOR (PACKCONTROL.SUPERVISOR) METHOD
                    (#[Unit: METHOD KEEDATATYPES]))
) ())
(CHAINPACKING.OP
        (PACKING.OP)
        ((CLASSES GENERICUNITS)) NIL
        ((DOER (PACKING.OP.CHAINED.DOER))
        (ENQUEUE (PACKING.OP.CHAINED.ENQUEUE))
        (LENGTH.PACKER)
        (UNDOER (PACKING.OP.CHAINED.UNDOER))) ())
(SCSI.CABLING.OP NIL
        (CHAINPACKING.OP) NIL ()
        ((CONSTRAINT.MONITOR (NIL))
        (ITEM (SCSI.CABLE))
        (LENGTH.PACKER (SCSI.LENGTH.OP))
        (QUEUE ((NIL))) ))
(LENGTHPACKING.OP
        (PACKING.OP)
        ((CLASSES GENERICUNITS)) NIL
        ((ASSIGNING.PROPOSER (PACKING.OP.LENGTH.ASSIGNING.PROPOSER))
        (CONSULTANT (PACKING.OP.LENGTH.CONSULTANT)
        (DOER (PACKING.OP.LENGTH.DOER))
        (SELECTING.MEASURE (PACKING.OP.LENGTH.SELECTING.MEASURE))
        (UNDOER (PACKING.OP.LENGTH.UNDOER))) ())
(SCSI.LENGTH.OP NIL
        (LENGTHPACKING.OP) NIL ()
        ((CONSTRAINT.MONITOR (NIL))
        (ITEM (SCSI.CABLE))
        (QUEUE ((NIL))) ))
(IPI.LENGTH.OP NIL
        (LENGTHPACKING.OP) NIL ()
        ((CONSTRAINT.MONITOR (NIL))
        (ITEM (IPI.CABLE))
        (QUEUE ((NIL))) ))
KBEND
```

V. THE LOADER

The Loader module 22 converts the syntactic External Form 18 into the A Priori level of the graph-based internal form. The Loader reads the External Form entered by the Developer 10 to identify Item definitions. It then creates internal data structures called objects or "frames" that hold the Item information. There is generally no explicit definition of Resources in the External Form. The Loader must take each Item and its properties and create implied Resources for it. The Loader knows which Resources to create by looking at the Item's consumes/supplies statements from the Item's definition. A frame is also created for each Resource. Each frame is given the name of its Item or Resource. Each frame contains a list of consumers and suppliers and their associated quantities. Thus, the relationships represented as the A Priori Graph are defined by the lists of names and quantities in the consumers and suppliers fields of each frame.

Figure 6:
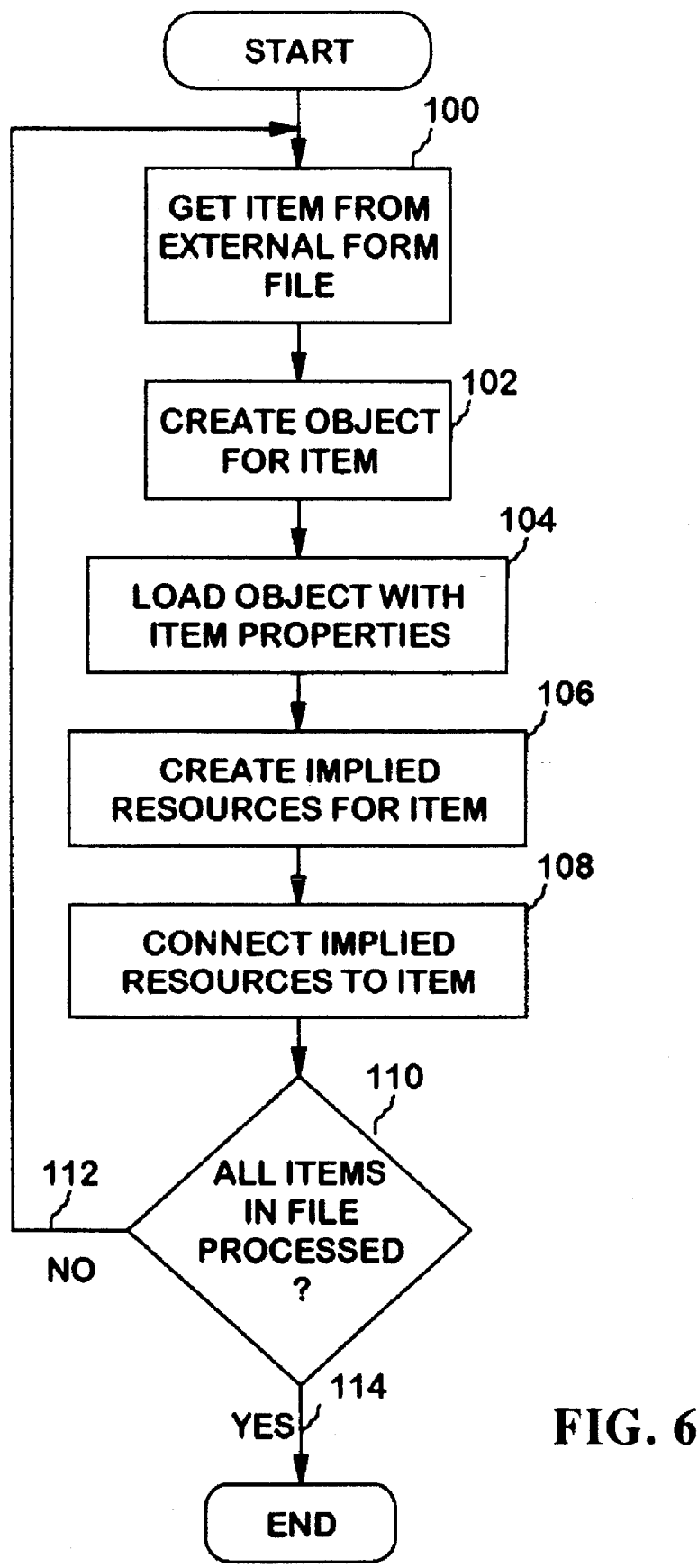
FIG. 6 is a flow chart of the External Form loading process.

FIG. 6 is a flow chart of the External Form loading process. At Step 100, the Loader parses the textual characters in the External Form file to get an Item. The parser reads text according to the External Form grammar definition described in detail in Appendix A. Next, the Loader creates a frame for the Item at Step 102. The frame is then loaded with the Item's properties obtained from the remainder of the Item's definition in the External Form file (Step 104). The Loader at Step 106 creates implied Resources for the current Item. This step is necessary only if each implied Resource does not already exist in the A Priori Graph. A new frame is created for each Resource identified, if one has not already been created by specific request or for a different Item. At Step 108, the Loader connects the implied Resources to the Item by modifying the fields in the frames representing the Item and the Resources. If all Items in the External Form file have not been processed (Test Step 110), then the No path 112 is followed to Step 100, where the next Item is obtained from the External Form file. If all Items have been processed by the Loader, then Loader processing ends via Yes path 114.

VI. THE LOGIC ENGINE

Generally, the Logic Engine 32 deduces from the A Priori Graph 24 and the Instance Graph 34 what a User's request to add a new component means to the existing state of the configuration. First, the Logic Engine examines the A Priori Graph 24 based on the User's request. The Logic Engine 32 creates Instances for Items and Resources based on the User's selections. The Logic Engine processes the Instance Graph ("propagates the net") to completion before the Packing Engine 36 (described below) executes. The propagation path is defined by the A Priori Graph, but the actual propagation of program control is across the new Instances created in the Instance Graph. The Logic Engine steps through the Instance Graph, node by node, to construct the correct linkages between Items and Resources. No forward or backward chaining is performed. The Logic Engine simply checks and updates the state of the graph. This processing design approach is much simpler than common designs for a rule-based knowledge representation. The Logic Engine uses a Work Queue to temporarily store logical links between nodes in the Instance Graph. For each Item, the Resource links get stored and then followed. These links are used as a control mechanism by the Logic Engine. It knows which node of the Instance Graph to process next by following the next link in the Work Queue. The net propagation process is iterative. In some cases, links stored on the Work Queue need to be combined, because the Resource links are related and connect to the same Item.

The Logic Engine provides callable functions for actions such as creating a given number of Instances of an Item, returning the Instances of a given Item, and connecting an Instance to another Instance it has been assigned to.

The supplies/consumes relationships inherent in the A Priori Graph define the limits of using components. For example, in the computer system context, a large mainframe system usually has few limits. However, small systems often have limits, such as the maximum number of slots on a motherboard. For any given system, a certain amount of Resources are available. These limits define the number of peripherals that may be connected, etc. When viewed from the graph perspective, limits are like the inverse of the configuration problem. In the A Priori Graph 24, consumption flows "upwards." That is, to determine what side effects result from adding a component, the Logic Engine looks up the Graph to see what Resources it consumes. In the Instance Graph, limits flow "downwards." To determine the limit on any given component, the Logic Engine 32 looks down the Instance Graph 34, starting with components that have absolute resource limits attached, and calculates the maximum quantity of the next lower level of components that could be requested. This process is repeated level by level until the given component is reached.

VII. THE PACKING ENGINE

It is possible for the Developer 10 to manually mark the nodes in the A Priori Graph for which spreading activation is inadequate and where packing is therefore required. Packing is the process of arranging some set of components inside another component according to some goodness of fit criteria (usually in as near as possible to an optimum way), and a "Packer" is the set of logic that executes this process. Each such node in the A Priori Graph can syntactically identify a different "Packer" that treats its needs in an appropriate way (see Appendix A for the syntax definition). A Packer is attached to the Item node that it packs, and any Resource connected to the Item is handled by that packer. The Packing Engine 36 is composed of multiple packers. The internal logic of packers is identical, that is, the core implementation of packer logic is a single block of reusable software. Thus, all packers execute the same cycle of processing. In the preferred embodiment, a packer is an object in the KEE. Alternatively, the packer may be represented as a C++ class object. Each packer class has default settings. The Developer defines the available packer classes in the Packer Definition 21 described above in Section IV. B. Developer-specified Constraint Expressions are normally all that distinguish different packers. The position of a packer attached to an Item in the A Priori Graph 24 and its Constraint Expressions define the task for a given packer. Packers use the Generate and Test problem-solving method.

In the preferred embodiment, packers are used to solve several distinct, but interrelated problems related to bin packing, stringing, cabling, rack packing, or other complex component assembly requirements. In the bin packing problem, a number of objects with physical dimensions must be packed in a type of container (bin). The goal is to find a packing solution that allows all objects to be packed in containers but that minimizes the number of containers used. For example, in a computer system, it is desirable to pack multiple peripheral devices into a minimum number of cabinets but still satisfy constraints such as front access requirements. Generally, a bin packing problem involves finding an optimal component placement sequence that fits within spatial and power-load constraints. In the "stringing" problem, the goal is to connect all peripheral devices that have been packed into cabinets such that available I/O cables can physically connect the peripheral devices and the length of the cables is also minimized. A "String" is a way of connecting multiple peripheral devices to an I/O channel, rather than have each device have its own I/O channel (which is expensive in terms of necessary additional hardware). A string minimizes the number of data paths to a host processor. In the computer system configuration domain, the stringing goal is to connect the devices in an optimal way that adheres to supplies/consumes constraint and combination restrictions expressed by Constraint Expressions. Constraint Expressions are used to define the characteristics of how the devices can be connected. The present invention provides a mechanism for solving both bin packing and stringing problems concurrently. Solving the bin packing problem in an optimal way may cause some stringing problem solutions to be sub-optimal, and vice versa. By attacking these problems concurrently, the Configurator produces a near-optimal overall solution.

For example, consider the situation of placing various components of a computer system into a cabinet. A cabinet supplies a fixed amount of rack space. In the A-Series computer systems available from Unisys Corporation, a cabinet may hold an I/O channel unit, which connects to a Channel Manager Unit (CMU), which connects to a Channel Adaptor Module (CAM). The CAM may then connect to a peripheral device such as a magnetic tape drive unit or a magnetic disk drive unit. These components all require a supply of electrical power from a Power Distribution Unit (PDU). When placing these components into the cabinet, the Configurator must determine an optimal solution by concurrently evaluating potential placements of components with other placements. Therefore, the Developer attaches a packer to the cabinet, I/O channel unit, CMU, CAM, and PDU components. These packers interact (as described further below) to find a preferred solution to the bin-packing problems.

When control flowing through the A Priori Graph 24 reaches a packing node, the spreading activation control flow is temporarily arrested and is allowed to follow other pending paths (any node with more than one arc leaving it creates multiple flow paths). Eventually, all available paths in the A Priori Graph are explored, and each path will either have run to completion or will have reached a packing node. The incomplete Instance connections at the set of nodes arrested because of pending packing decisions define the packing work yet to be done, and the packing nodes themselves identify the set of Packers in the Packing Engine 36 that must be invoked to perform the next stage of processing. All Packers thus identified are initiated. One of these Packers should be the next useful work processed by the Configurator.

Given a set of Packers, each with work to do, the question is how to identify which Packer should take priority over the other Packers. In the present invention, each Packer is capable of prioritizing its own local work. The Configurator must also coordinate work among all Packers. To address this problem, Packers are invoked by a Master Scheduler that requests their desired actions and correlates their responses. The Master Scheduler consists of two processing elements, a Supervisor, and a Master Consultant.

Note that Packers operate primarily in terms of Instances. The Packers can connect Instances together and can create new Instances in the Instance Graph. These actions may, in turn, cause propagation and stalling in the A Priori Graph.

A. Packer Processing

Figure 7:
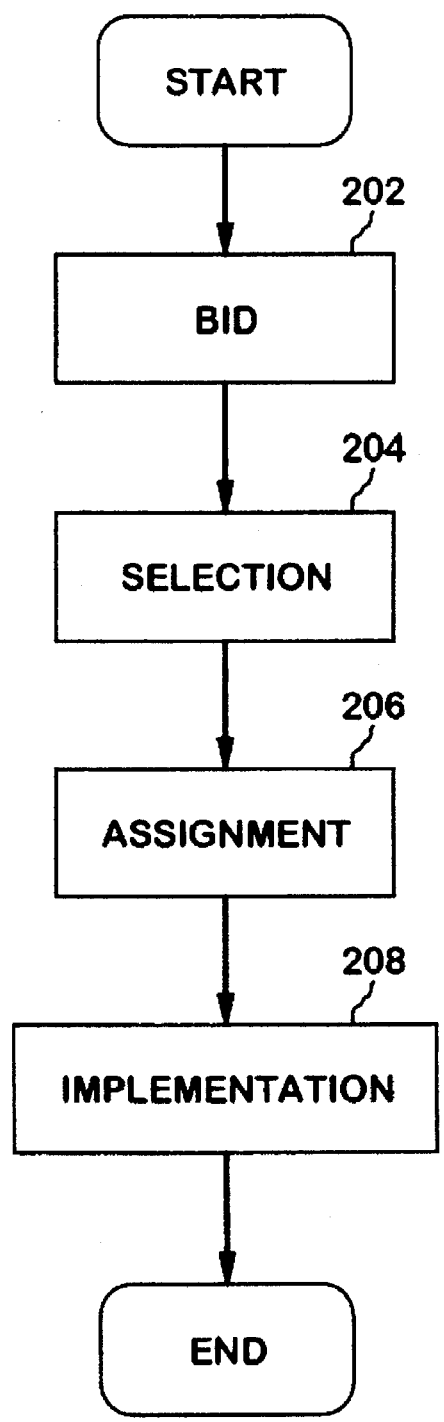
FIG. 7 is a flow diagram of individual Packer processing steps.

The processing of an individual Packer is broken into several separate phases, and the results returned are expressed in a standardized form, so as to allow for correlation by the Master Scheduler. FIG. 7 is a flow diagram of individual Packer processing steps. In the Bid step 202, each active Packer identifies the one action that is the most important for it to perform next, and assigns it two weights between 0 and 1 representing how desirable this action is, and how constrained it is (i.e., how many other placement possibilities exist for this choice). In the Selection step 204, the bids are compared, using a weighting scheme to combine desirability and how constrained the possible placement is. A single Packer is selected by the Master Scheduler to develop its bid further. In the Assignment step 206, the selected Packer temporarily implements its proposed action, by creating Instances and/or making connections in the Instance Graph 34, and invokes Consultant processing (described below) of the other Packers to determine whether the resulting configuration state would be legal from all points of view. If not, an alternative assignment choice can be made; if it would be legal, look-ahead is performed from the new state in case it could cause problems later (as in the peripheral/power supply space conflict example discussed above). Look ahead is the process of exploring in detail the implications of a choice already tentatively made to determine if there are foreseeable adverse consequences of the choice. The look-ahead process can be allowed to run to completion (for best results), or it can be prematurely terminated after a pre-set number of levels (for better performance). An Assigning Proposer may make a choice for a given packer when called by the Master Scheduler. This choice may consist, for example, of putting a component on a String. Each packer contains logic to assess the proposed choice from its own point of view. Another packer may then acquiesce or object to the proposed choice. The Assigning Proposer actually inserts new Items into the Instance Graph to reflect its choice. These insertions are then backed out, after approval by the other packers. In the Implementation step 208, if no problems are found during the Assignment phase, the selected action is made permanent.

In all cases, the definition of what constitutes an illegal state is in a declarative form, not in program code. The ability to carry this approach through successfully depends on the above factorization of Packer functionality, and on its integration with the underlying graphs.

B. The Selecting Proposer

Figure 8:
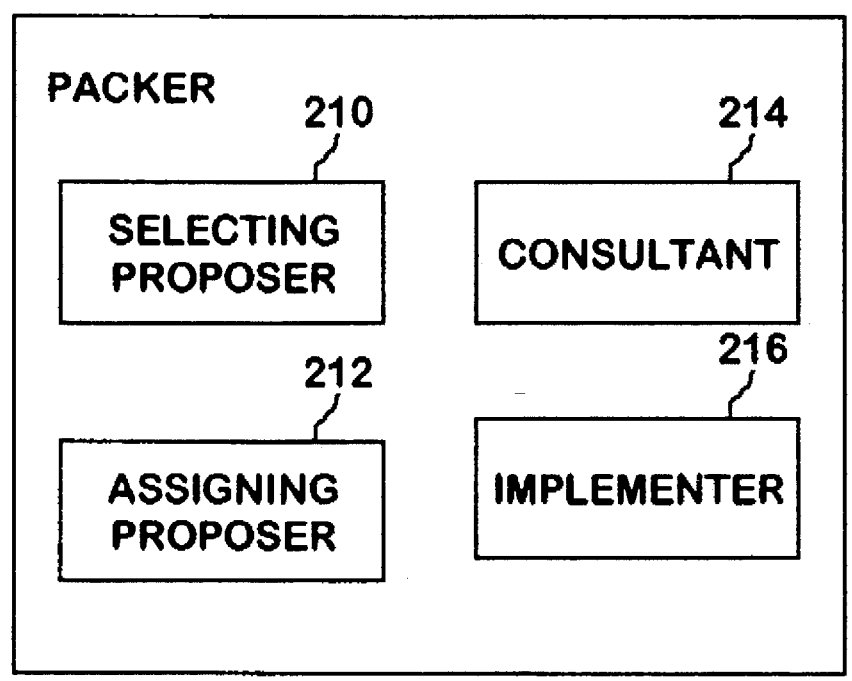
FIG. 8 is a block diagram representing the four parts of a Packer.

FIG. 8 is a block diagram representing the four parts of a Packer. The Selecting Proposer 210 makes the choice of what to bid for a proposed course of action affecting the Instance Graph 34. It chooses the Instance it would most like to place next, and rates it on scales of 0 to 1 in terms of desirability and importance. The Selecting Proposer 210 employs a list of the existing Item Instances that the Packer needs to process. It then looks at all possible choices for placing each Item Instance in the Instance Graph. The action of implementing a given choice is called a task. For each possible task, the Selecting Proposer performs the following processing. It computes a Constrained Measure, which represents the restrictions on executing the current task due to limit reasons or constraint reasons as determined by this Packer's Consultant 214. It computes the Constrained Measure by identifying the number of members in the list of existing Item Instances that the current task cannot be assigned to. If the current Task cannot be assigned to a new Instance as determined by the Consultant 214, then the Selecting Proposer adds the number of new Instances that could be made (according to the limits) to the Constrained Measure. A Strategy Measure is computed to represent the value of assigning the current task to be the next action implemented by the Packing Engine 36, according to a Developer-specified strategy function. Next, a Value is computed to represent a Developer-defined combination of the Constrained Measure and the Strategy Measure. If the Value just computed is the best Value seen by the Selecting Proposer as it cycles through each possible task, the Value is saved as this Packer's Best Value and the current task is saved as this Packer's Best Task.

After all tasks are analyzed, the Selecting Proposer returns the Best Task and the Best Value.

C. The Assigning Proposer

The Assigning Proposer 212 fills in the details of a selected bid. It takes the choice and tries to legally place it in the Instance Graph. It checks with relevant Consultants of other Packers to ensure that the proposed placement doesn't cause problems. It also looks ahead to avoid causing future problems. The Assigning Proposer examines each existing Instance of Item(s) that the Packer is attached to. It temporarily assigns the task passed to it by the Supervisor to an Instance in the Instance Graph. If the proposed assignment doesn't exceed a limit, and the Master Consultant processing of the Master Scheduler indicates that this assignment is acceptable, then the Assigning Proposer returns the Instance to the Supervisor.

If placement in an existing Instance is not possible, the Assigning Proposer 212 temporarily assigns the task to a new Instance. If the Master Consultant indicates that this is acceptable, then the Assigning Proposer returns a "new" indication to the Supervisor. Otherwise, the Assigning Proposer returns a "no assignment" indication to the Supervisor.

D. The Consultant

The Consultant 214 reviews the global state of the proposed Instance Graph to check its legality from this Packer's perspective. It indicates whether the proposed Instance Graph is allowable or not. The Consultant 214 evaluates the constraints of the Packer within the context of the Instance passed to it from the Selecting Proposer. It returns the result of this processing.

E. The Implementer

The Implementer 216 causes a permanent change in the Instance Graph to be made for the proposed course of action after all affected Packers have passed it as allowable. It performs the proposed course of action on the Instance Graph, thereby updating it as a result of a User's request.

F. The Master Scheduler

Figure 9:
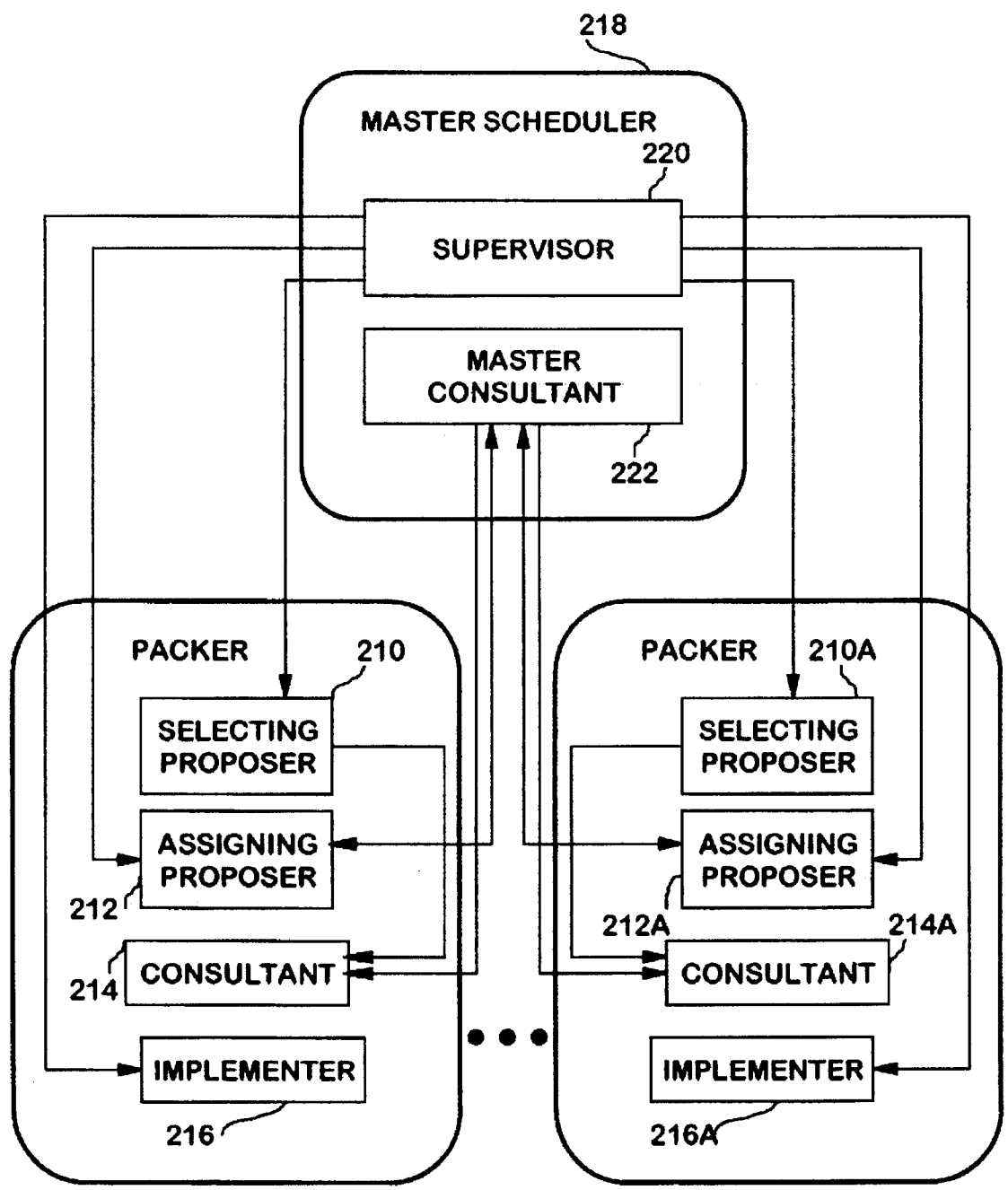
FIG. 9 is a block diagram illustrating the relationships between the Master Scheduler and the Packers.

FIG. 9 is a block diagram illustrating the relationships between the Master Scheduler and the Packers. The Master Scheduler 218 consists of two independent modules, the Supervisor 220, and the Master Consultant 222. The Master Scheduler 218 coordinates the actions of the Packers. It requests a proposal from each active Selecting Proposer 210. It chooses the most important proposal that is submitted. It requests placement for the proposal from the corresponding Assigning Proposer 212. If the assignment is successful, it calls the Implementer 216 of the Packer that made the proposal to make the proposal permanent. This process repeats until no Packers have work left to do.

The Supervisor 220 is a control process within the Configurator 16 that only terminates when no further packing activity can be accomplished on the Instance Graph. It continually queries the Packers to determine the most important task to perform in generating a configuration. For each Packer specified in the A Priori Graph, the Supervisor 220 calls the Packer's Selecting Proposer 210 to obtain the Packer's Best Task and Best Value. If a task was returned by the Selecting Proposer and the value returned is the best seen thus far, then the Supervisor saves the Packer as the Best Packer and the task returned as the System Best Task.

After all Packers have been queried, if a System Best Task was identified, then the Supervisor 220 calls the Best Packer's Assigning Proposer 212 with the System Best Task as an input to obtain a new Instance to be assigned. If an assignment was found, then the Supervisor calls the Best Packer's Implementer 216, passing the System Best Task and the assignment as inputs, to implement the assignment. If no assignment was found, then the System Best Task is set aside into a temporary storage area and the process repeats. If a System Best Task was not identified, the Supervisor's 220 processing is complete.

The Master Consultant 222 is called by a Packer's Assigning Proposer 212 to determine if a proposed course of action is acceptable to all Packers. It queries each Packer's Consultant 214 in turn. If any Packer's Consultant objects to the proposed course of action, then the Master Consultant 222 returns a negative indication to the Assigning Proposer that called it. The Master Consultant also examines each unassigned task in turn. If the Assigning Proposer of the task's Packer returns an assignment for the task, then the Master Consultant returns a positive indication to the Assigning Proposer that called it. If neither of the above cases occurs, then the Master Consultant returns a negative indication.

Compared to the rigid, sequential flow of control of the Logic Engine in propagating the Instance Graph, the Packers have a very fluid, concurrent flow of control between them. This flow is driven by the current partial configuration state and what action is the most important to complete next. This allows different Packers to control Configurator processing at different times, depending on when the component they are responsible for becomes the most important at a particular stage of processing.

The Packers operate by adding to the existing configuration whatever set of Resource Instances they are given by the Logic Engine. If many Instances are being considered at once, they will all be packed in parallel as additions to what is already configured. If only one Instance is being considered, it will be added directly to the existing configuration. If no Items are already packed, then all the given Instances are packed as well as possible. The Packing architecture thus supports both addition of small increments to a configuration, and completely re-packing an entire configuration. The results of full configuration re-packing are usually better than incremental packing.

G. A Packing Example

This example builds on the computer system Instance Graph and assumptions that were discussed above in Section III. It requires a small amount of special strategy code in a Cable Packer Selecting Proposer; this code prefers to select work on a peripheral device that can be attached to an existing string, rather than work that requires a new string (which would be the default). A string is a way of connecting multiple devices to a set of I/O channels. Suppose the Packing situation is:

- one of the peripheral devices shown in FIG. 5 has not yet been placed into a cabinet (i.e., its Cabinet_Space and, therefore, Power, connections have not been filled in);
- there is space in the existing cabinet for one more peripheral device, but no more;
- sufficient sockets and current are available from a power supply already packed into the cabinet;
- the string to the peripheral device already placed in the cabinet can accommodate the unplaced peripheral device, but not (because of cable length) if it were placed in another cabinet Instance;

there is another peripheral device of a different type in need of cabinet space that cannot be strung with any peripheral device in the existing Cabinet.

Essentially, two Packers must run in some sequence for each peripheral device: a Cabinet Packer and a Cabling (Stringing) Packer. Each Packer will be asked to bid on its next most-desired action. The Cabinet Packer has no basis for preferring one peripheral device above the other, and might therefore bid either of them, but only with low weights. The Cable Packer will bid the peripheral device that can be strung, because of the additional strategy, with relatively high weights. The Cable Packer will therefore win the bidding and go on to assign the stringable peripheral device to an existing string. Since the resulting situation is legal, it will be made permanent.

A new round of bidding is now started. This time the Cabinet Packer observes that the newly strung peripheral device is now partially placed so it bids that peripheral device in the existing cabinet. The Cable Packer is relatively unconcerned about the remaining peripheral device and hence bids it with low weights. Thus, the Cabinet Packer wins the bidding. There are no problems with the assignment process, and the placement is therefore made permanent.

The remaining peripheral device will then be placed in a new cabinet on a new string.

This scenario will work out very differently with a slight change in the initial conditions:

the unstrung one of the two stringable peripheral devices is a tape drive device which requires space in the front access area of its cabinet;

the existing cabinet has no free space in its front access area.

Under these conditions, the Cabinet Packer will bid the tape drive device because that is the more constrained option, but not with very high weights. The Cable Packer will bid the same device because it can be strung, with fairly high weights. The Cable Packer will therefore win, and try to string the peripheral device as before. Unless the Look Ahead depth has been set too low by the User, Look Ahead during cable assignment will attempt to place the chosen device into the existing cabinet, but it will fail to do so because of the need for front access area. It will therefore create a new cabinet Instance and place the device in the front access area in the new cabinet. However, further Look Ahead processing will discover that the Cable length constraint is now violated. The placement onto the existing string therefore fails. A new string will be created, and successful allocation into a new cabinet will follow. The second device will then be placed on a new string in the old cabinet.

Consider now a slight change to the previous scenario;

the existing cabinet has free space in its front access area;

This leads to a simpler processing sequence, with somewhat different weights.

During bidding, the Cabinet Packer observes that the tape drive device requires front access area, and is therefore the more constrained choice. It therefore bids that device with fairly high weights, but the Cable Packer (which will bid the same device for stringing) assigns higher weights because of the manual strategy, and therefore wins the bidding. No problems arise with assignment in this scenario, and the second device goes, again, in a new string in a new cabinet.

All of these variations in processing are generated as necessary by the Packing architecture. They arise from interpretation of the Constraint Expressions attached to the packable Items in the Instance Graph, coupled with very limited specialized code associated with each Packer for bid computation and next-Item selection. In the example of FIG. 3, the relevant Constraints are attached to the Cabinet (which has a Supplies of 36 Cabinet_Space that defines the Range from 9 through 26 as being Front_Access), the peripheral device (which has a Consumes of some amount of Cabinet_Space and specifies the need for Front_Access if it is a tape drive device), and the Cable (which has a Constraint on total Cable length, which is discussed below in Packer Parameterization). The Configurator Developer 10 must enter all of this information into the External Form 18 in order to generate a correct configuration for all scenarios.

VIII. CONSTRAINT EXPRESSIONS AND THE EXPRESSION HANDLER

There are two levels of control of the Packing processes: strategic and tactical. The strategic level addresses the sequence in which Packer parts are selected for processing, and the generation of bid weights. These activities are not controlled in a completely declarative fashion. The tactical level is concerned with the legality of choices made: avoiding obviously illegal choices in the Proposers; and reviewing the choices from all relevant perspectives in the Consultants.

The tactical level of control is implemented by means of a general Expression Handler that interprets Constraint Expressions written in a fully parenthesized, arbitrarily nested, pre-fix form, functional language. There is one and only one Expression Handler 37 in the Configurator. It is called by the Logic Engine 32 and the Packing Engine 36. The need for calling the Expression Handler is determined by the current position in the Instance Graph. Since complex interactions between Items cannot always be specified in terms of consumption and supply of Resources, Packers allow for the specification of constraints on the Items they are attached to. Constraint expressions are data specified by the Configurator Developer that define the inter-relationships of the components available to be configured. That is, they describe the relationships that can be allowed exist among Instances of Items in the Instance Graph. The Expression Handler is a program capable of evaluating an expression to produce its return value. These expressions are stored on the Items in the A Priori Graph that have Packers attached. The interpretation of them is always performed with respect to the current state of the Instance Graph. An expression is a combination of function calls and arguments that can be evaluated to produce some needed result. An argument is a parameter passed to a function. The expressions yield a true or false result indicating the legality of the current state from the perspective of the Packer to which they are attached. The attachment to individual Packers allows the definition of legality to be partitioned in a manner that is natural for Developers of Configurators. The syntactic form for the expressions is converted to an internal parsed form by the Loader 22, and they are therefore easily accessible for modification when the rules governing configuration legality change. All non-local legality checking is controlled by these expressions.

The general form of an expression or a phrase in an expression is (<function-keyword>[<argument>] . . . )

The <function-keyword>s come from a pre-defined list of functions that cannot be extended without implementing additional program code. The arguments can be literal values, lists of values, T (true), NIL (false or empty), names of nodes in the A Priori Graph, or sub-expressions in the above general form. The results can be in any of these forms except sub-expressions. Certain structured value types are available for handling data types specific to particular aspects of the configuration problem (e.g., Position). Additionally, and very rarely, the concept of a "Path" is needed to explicitly control the process of stepping through a region of the Instance Graph when multiple paths join the same pair of Instances.

The pre-defined functions allow operations such as retrieving from the Instance Graph all relevant instances of a named Item, counting the number of entries in a list, or applying a predicate to the entries in a list and checking whether the predicate is always ("Every") or ever ("Any") satisfied. Evaluation of the expression is carried out in a context in which, initially, the Instance of the Item containing the expression is considered the "current" Instance. Implicitly, references to Instances of other Items within this context are only to those Instances that are attached, directly or indirectly, to this Instance. The context is re-bound automatically for each Instance in the List as functions such as Every or Any are executed, so that the implicit Instance is the one currently being considered from the list that the function is processing. A specific context can be selected by means of the In.Context function. The effect of this contextual dependency is to allow Developers to specify Configurators entirely at the level of the A Priori Graph, without needing to control operations at the Instance level. This simplifies both the language and the process of developing Configurators.

When an Instance is indirectly attached to the current Instance, it is conceptually necessary for the Configurator to search the possible paths in the Instance Graph from the current Instance to locate the context for the target Instance; similar processing is needed to identify all members of a named Set. A Set is a collection of Items. This context processing would be slow if performed directly every time it is needed. However, it can be automatically optimized at load time by expanding Set names into their constituent Items and by explicitly stating the path of nodes to be followed to reach each name given.

The path specifies, in sequence, Items and Resources that are to be followed between the current Item and the given name (thereby avoiding any search). These optimizations mean that the internal form of expressions will differ slightly from that intended to be written by the Developer. It is possible to allow Developers to explicitly write the internal functions needed (thereby avoiding the need to program the more complex loading process), but to do so would make the resulting Configurator very difficult to maintain because of the tight dependencies between the Constraint Expressions and the structure of the A Priori Graph.

A. A Constraint Expression Example

As an example, again from the computer system configuration domain, the length Constraint Expression, attached to a SCSI Cable Packer to ensure that total cable length limitations are not exceeded, can be given as follows:

(<= (+ (COLLECT (PROPERTY.VALUE LENGTH)(CHAINED-
.INSTANCE.VALUES SCSI.CABLE))) 82)

This is interpreted to mean:

"From the present SCSI.CABLE Instance, follow the connectors on each end of the cable to find all the attached SCSI.CABLEs." The function CHAINED.IN-STANCE.VALUES performs this operation, returning a list of all the Instances it found, including the starting one.

"For each instance returned, retrieve its LENGTH property; return all these properties in a list." The function PROPERTY.VALUE returns the value of a named property from the current Instance. The function COLLECT iterates over the list of Instances given as its second argument. It collects into a list whatever comes back from the expression given as its first argument when it is applied to each of the Instances. This list is finally returned to the caller. The context in which PROPERTY.VALUE is applied is automatically re-bound by COLLECT as execution proceeds down the list, resulting in (PROPERTY.VALUE LENGTH) being applied to each Instance returned by CHAINED.IN-STANCE.VALUES. This processing yields a list giving the lengths of all the Cables in the string containing the cable under consideration.

"Sum the returned list of values." Like many functions in this language, "+" can be given a single argument consisting of a list of values instead of the normal 2 or more arguments; it detects this situation and automatically sums all the entries in the list, returning in this case the total length of Cable on this channel.

Finally, the last action is "Check that the total length is less than 82."

B. Functions Supported By The Expression Handler

Figure 10:
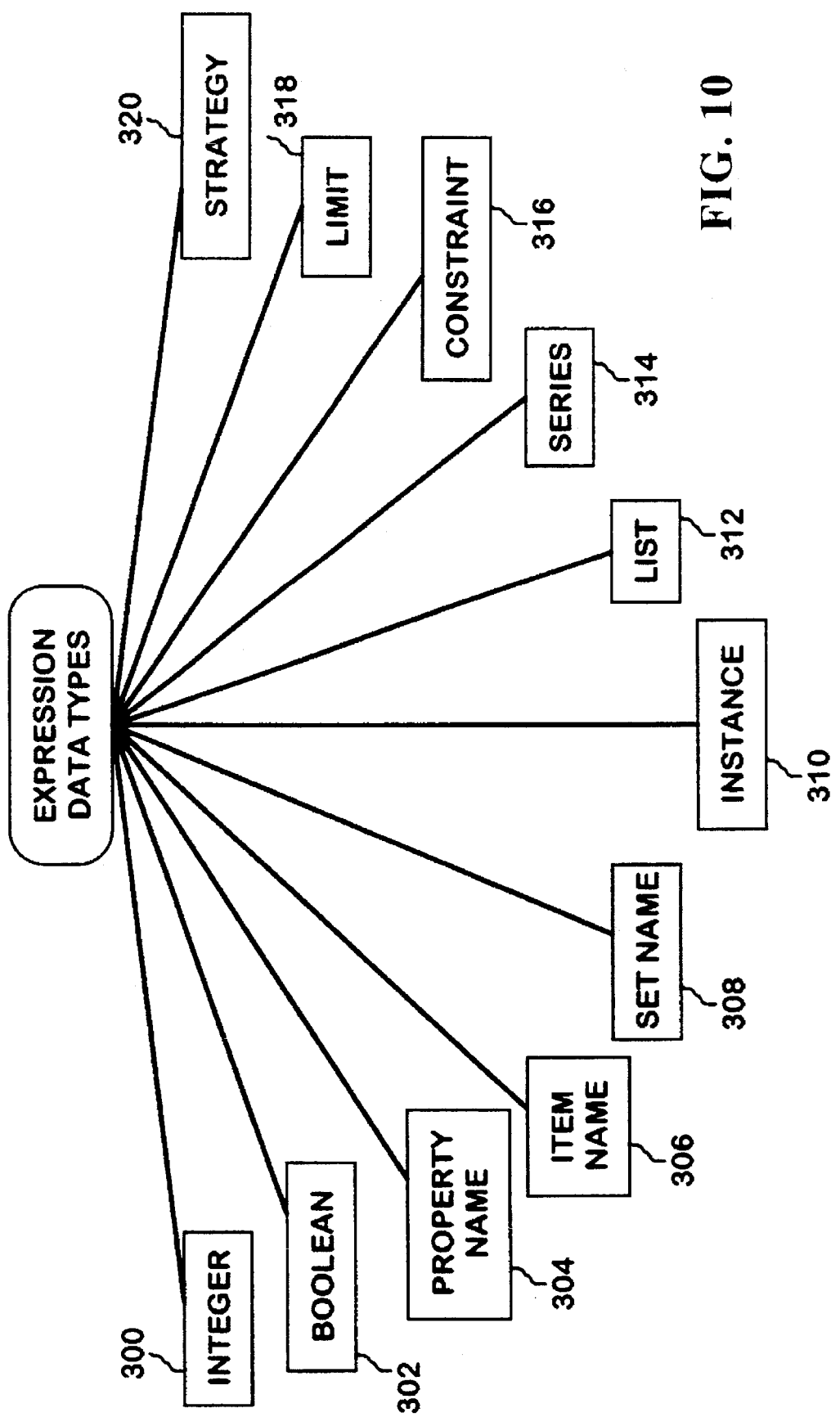
FIG. 10 is a block diagram of the data types supported by the Configurator Expression Handler.

More definitively, an Expression is a limited functional expression in parenthesized prefix form, returning a value. It can contain nested sub-expressions and can be composed of many different argument data types and functions. FIG. 10 is a block diagram illustrating the data types supported by the Configurator Expression Handler. The Integer data type 300 includes normal integers, plus "()" (the empty set), whose interpretation depends on the function it is passed to, but is defined neither to cause an error nor to affect the result value of commutative operations, and "T", whose value is always "1". The Boolean data type 302 includes "0" (which is equal to "()" and "False"); anything else is considered "True". Arithmetic functions returning a Boolean return "0" for "False", "1" for "True". List functions returning a Boolean return "()" for "False", and the last list item successfully tested for "True", unless this would return "()", then "True" is returned. The Property-Name 304, Item-Name 306, and Set-Name 308 data types define character-based identifiers for a Property, Item, or Set, respectively. The Instance data type 310 is not directly specifiable syntactically. It may be an implicit argument. The List data type 312 is a list of arguments of any other data types (including List). A List is an ordered collection of values of indeterminate length, conventionally written with surrounding parentheses. Lists may contain lists.

The Series data type 314 defines an indefinite length list of arguments to a function. It does not itself need to be enclosed in parentheses; its entries simply follow the function name inside the parentheses that enclose the function call. Any function that accepts a list as its final argument also alternatively accepts a Series in that position (the two cases can be distinguished by the number of arguments present). Depending on the function, the Series may be treated as if each element of it is an entity and retains its separate identity, or as if the content of each element was spliced together with the contents of the other elements to form a single list. Functions that return multiple values always return them in a list.

The Constraint data type 316 requires a return value of Boolean. The Limit data type 318 must return an Integer. There are two types of Strategy data types 320. The Strategy data type for unpacked Resources requires a list of Items sequenced in decreasing order of desirability. The Strategy for packed Resources requires a number that will be used as the weight a Proposer is to assign to a proposal for the current Instance.

Figure 11:
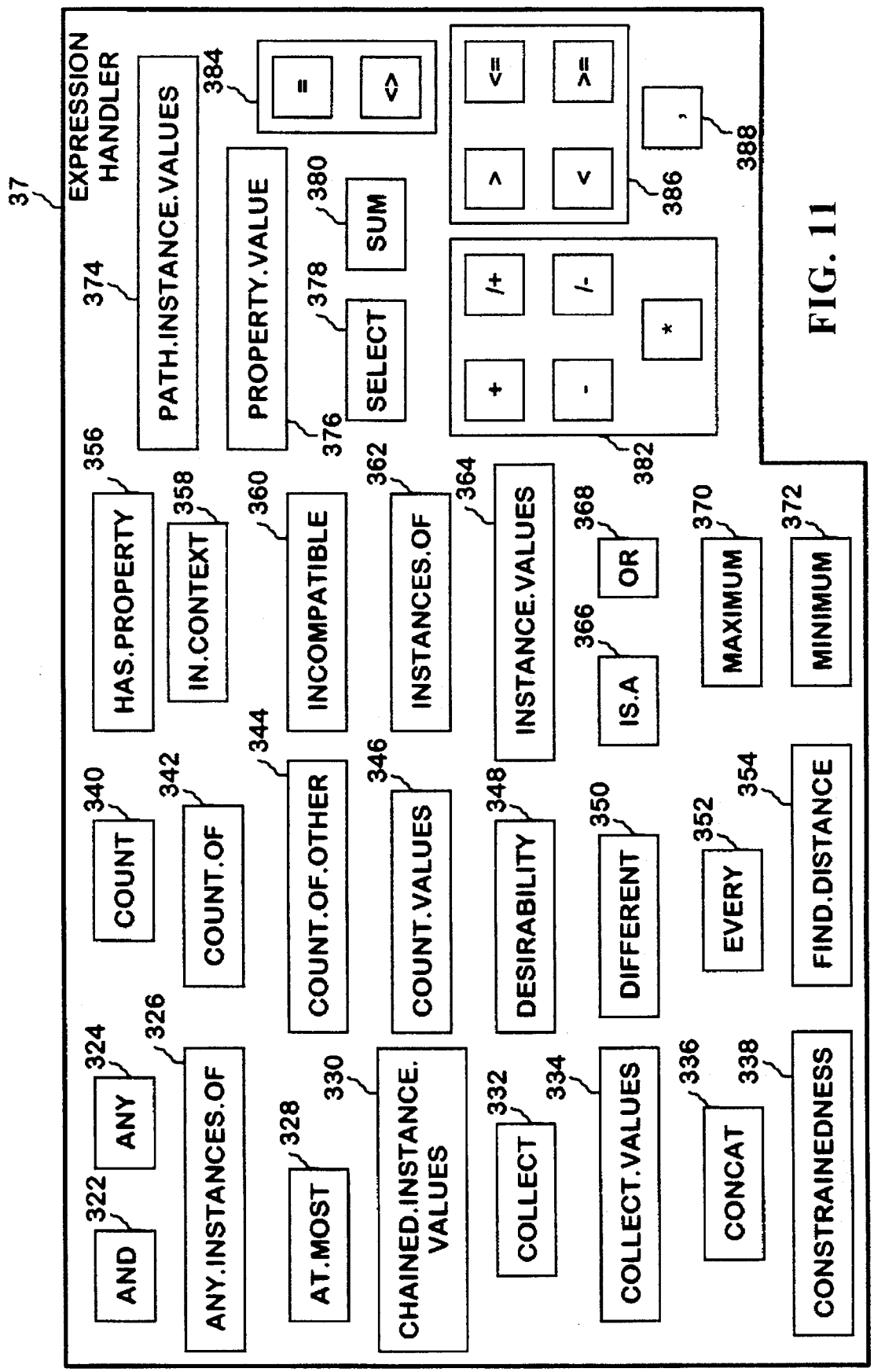
FIG. 11 is a block diagram of the functions supported by the Expression Handler.

FIG. 11 is a block diagram of the functions supported by the Expression Handler. The And function 322 is the standard Boolean connective. It accepts a Series of expressions for its input parameters. The And function returns the value of the last expression examined for "True" and the empty list "()" for "False" if the last expression examined was a List or Instance, or "0" for "False" if the last expression examined was an Integer. The Any function 324 accepts a Predicate and a List of Instances or a Series of Lists of Instances for its inputs. A Predicate is a test expression which returns true or false when evaluated. The Any function returns "True" (the first satisfying entry, or "T" if that is "()") if any entry in the List satisfies the Predicate, or "False" (the empty list "()") if none do. The Any.Instances.Of function 326 accepts an Item Name or a Set Name and an optional Path or its inputs. It returns "True" (the first satisfying Instance) if any Instance of the given name exists in the current context, and returns "()" if there are no such instances. The At.Most function 328 accepts a Count, a Predicate, and a List of Instances for its inputs. It returns "True" (the last satisfying entry in the List or "T" if that is "()") if no more than Count number of Instances in the List satisfy the Predicate. Otherwise, the At.Most function returns "False" (the empty list).

The Chained.Instance.Values function 330 accepts as its first argument an Item name or Set name with optional Path, and as its second argument a list of Resource names. It returns a List of the Instances of the given Item or Set name(s) in the current context. It also returns this information for all other similar Instances reachable from the original one via the Resource names given in the second argument. Reachable Instances are located by a chaining process that follows both the Consumes and Supplies links of the original Instance where these lead to Instances of a Resource listed in the second argument. All of the Consumes and Supplies links of these Resource Instances are then followed (except the entry link) and the attached Item Instances collected. The Consumes and Supplies links of these Instances (except the entry link) are then followed where they lead to Instances of a listed Resource, etc. This process continues until there are no more Consumes or Supplies links to follow. The Chained.Instance.Values function is useful for finding everything on a String. A String is contextually driven, it is not determined or defined by a List. The Instance Graph is always in flux and the Expression Handler determines the String by context.

The Collect function 332 accepts an expression returning some value from an Instance (e.g., Property.Value) and an Instance List or a Series of Lists of Instances as its inputs. It returns a List containing the corresponding value from each Instance. The Collect.Values function 334 accepts an expression returning some value from an Instance and an Instance List or Series of Lists of Instances. It returns a List containing the corresponding value from each Instance for all Instances that have a value other than "0" or "()".

The Concat function 336 accepts a Series of Lists and returns a single List holding the contents of all of the input Lists in sequence. The Constrainedness function 338 takes no arguments as input, but returns a number that is a function of the degrees of freedom the current Packer has in placing the current resource Instance. This number must be in the range 0 to 1, where 0 means effectively unconstrained, and 1 means critically constrained. This value is meaningful only for packed Resources. The Count function 340 accepts a List or a Series, and returns an Integer giving the number of entries in the List or the total number of entries in all of the Series (splicing). The Count.Of function 342 accepts an Item Name or Set Name as its inputs. It returns the number of Instances of that Item or Set. The Count.Of.Other function 344 accepts an Item Name or Set Name as its input. It returns the number of Instances of the specified Item or Set excluding Instances of the Item containing the expression. The Count.Values function 346 accepts a List or a Series, and returns the number of entries in the List or Series that are not "0" or "()" (non-splicing).

The Desirability function 348 takes no arguments as input, but returns a number that is a function of the desirability for the current Packer of placing the current Resource Instance. The number must be in the range 0 to 1, where 0 means no desirability considerations apply, and 1 means highly desirable. This value is meaningful only for packed Resources. The Different function 350 is a relational operator. It is used for comparing any one of the individual value types (not Lists), including Instances. All arguments to a single Different function call must be of the same data type. This function ignores "()" values in its input, accepts two or more arguments, or a single List argument whose contents are used as the arguments. The Different function checks that all arguments have different values (i.e., no two are the same). The returned value depends on the data type of the input arguments: for arithmetic arguments, "False" is "0", "True" is "1"; for all other arguments, "False" is "()", "True" is the last item successfully tested. The Every function 352 accepts a Predicate and a List of Instances or a Series of Lists of Instances as its inputs It returns "True" (the last satisfying entry, or "T" if that is "()") if all entries in the List satisfy the Predicate, or "False" (the empty list "()") if at least one does not.

The Find.Distance function 354 accepts a List or a Series of Instances as its inputs. It returns the physical length of the path from the current Instance through the given Instances in sequence to the last Instance. The Has.Property function 356 accepts a Property Name as its input. It returns "True" (the value of the property if any, and not "()") or "False" (the empty list) according to whether the current Instance has the specified property or not. The In.Context function 358 accepts an Item Name or Set Name and an expression as its inputs. It returns whatever the expression evaluates to in the context of the appropriate Instance of the names Item or Set. The Incompatible function 360 accepts a Series of Item Names or Set Names as its inputs. It returns "True" (the entry present, if any, or "T" if that is "()") or "False" (the empty list) depending on whether no more than one of the entries in the Series are present in the current context, or more than one are present. The Instances.Of function 362 accepts an Item Name or Set Name and an optional path as inputs. It returns a List of the Instances of the given name(s) in the current context, and "()" for any name that has no Instances.

The Instance.Values function 364 accepts an Item name or Set Name and an optional path as its inputs. It returns a List of the Instances of the given name(s) in the current context. It ignores any name(s) with no Instances. If the path is given, it specifies the nodes to be traversed in the Instance Graph to reach the given Item Name from the Item on which this expression occurs. By default, graph traversal starts in a downward direction, but will reverse to traveling upwards through the Instance Graph after the initial Item is reached. For complex cases, the keywords "UP" and "DOWN" are used to explicitly specify direction changes. If the path travels through any one of several possible nodes at some point, the list of possibilities is given in parentheses.

The Is.A function 366 accepts an Item Name or Set Name as input. It returns the current Instance ("True") if it is in the Set or is an Instance of the Item. Otherwise it returns "()". The Or function 368 is a standard Boolean connective that accepts a series of expressions. It returns the value of the last expression examined for True, the empty list for False if the last expression examined was a List or Instance, or "0" for False if the last expression examined was a number. The Maximum function 370 accepts a List or a Series of numbers and returns the largest of them. The Minimum function 372 accepts a List or Series of numbers and returns the smallest of them. The Path.Instance.Values function 374 accepts an Item Name or a Set Name and an optional path. It returns a List of Instances of the given name(s) in the current context, ignoring any name(s) that have no Instances. Each Instance is represented the same number of times as it has paths to the context. The Property.Value function 376 accepts a Property Name, and returns the Property's value from the current Instance. The Select function 378 accepts a Predicate and a List of Instances or a Series of Lists of Instances as its inputs. It returns a List containing those entries in the original List for which the Predicate is true. The Select function operates by iterating over the List, and the Predicate is evaluated on each iteration after binding the context to the current Instance from the List. The Sum function 380 accepts a List or a Series of numbers and returns the sum of the numbers.

The +, −, *, /+, and /− functions 382 are standard arithmetic operators. The /+ function divides rounding up (i.e., it provides ceiling). The /− function divides rounding down (i.e., it provides floor). The =and <> functions 384 are relational operators defined for comparing any one of the individual value types, including Instances. All arguments to a single function call must be of the same data type. These functions ignore "()" values in their input, and they can accept two or more arguments, or a single List argument whose contents will be used as arguments. The = function checks if all arguments are equal. The <> function is the inverse of the = function. The returned value depends on the type of the input arguments: for arithmetic arguments, "False" is "0", "True" is "1"; for all other arguments, "False" is "()", "True" is the last item successfully tested. The <, <=, >=, and > functions 386 are arithmetic relational operators. They return "0" (false) or "1" (true). These functions are defined for arithmetic arguments only. If more than two arguments are given, the values must be in the appropriate monotonic sequence. Finally, the "," function 388 is used for grouping sub-expressions to control the evaluation sequence.

Empty lists are acceptable anywhere a List is allowed. An empty list has a sum and a count of 0, Any is "False", and Every is "True". The Select and Collect functions return an empty list if given one.

In all cases where a function defined above accepts an Item Name or a Set Name, there is an internal form of the same function that does not accept a Set Name, requiring it to be expanded into the corresponding list of Item Names, and which requires the path to each Item to be explicitly stated. The translation from the external to the internal forms of these functions, which can be performed automatically, may require different paths for different members of the same Set, depending on the structure of the related parts of the Instance Graph.

IX. THE INTERFACE ENGINE

Referring back to FIG. 1, the Interface Engine 28 provides a graphical user interface through the Display 30 to the User 26. It also accepts inputs from the User via Input Device 14. The graphical user interface consists of standard capabilities well known in the programming art such as windows, selectable buttons, icons, and the like. The Interface Engine coordinates the receipt of User requests with the Logic Engine 32. It also displays configuration status on the Display as a result of a User's request. The graphical user interface is largely independent of the logic of the configuration. It may be continually changed or refined as needed.

A. Data Entry Forms

Data Entry Forms are objects that define the format used for the entering of data for a particular Item by the User. FIG. 12 is an example of a Data Entry Form as shown on the Display. This example shows user choices for configuring a USR 4000 magnetic disk peripheral device available from Unisys Corporation. These Forms are defined as data, and interpreted, when called for, by the Interface Engine 28. The linkages between the fields in the Data Entry Forms and the underlying Configurator logic in the Instance Graph 34 are explicitly present in the interface definition data supplied by the Configurator Developer 10, rather than being implicit in Configurator 16 program code. As far as possible, Data Entry Form definitions do not reference specific Items in the Instance Graph. Instead, the specifics are determined contextually from the path the User has followed through the graphical user interface displays (i.e., the menu hierarchy), combined with interface information from the Instance Graph.

The Interface Engine 28 supports the following requirements for a data-driven user interface. Values entered by the User 26 are persistent; they can be modified in later Configurator sessions. These values may be used to control component replacements as new components are introduced and old ones are deleted from a product set. The Interface Engine supports automatically changing the state of visible components shown on the Display 30 as the User enters data into other components. The meaning of the entry of data in particular fields of a Data Entry Form must be explicitly specified by the developer in terms of the corresponding changes in the Instance Graph.

Every field on a Data Entry Form accepting user input has an unique "tag" associated with it. This tag constitutes a name for the value entered into the field. The set of tags and associated values for an Instance of a Data Entry Form are stored in the Instance Graph 34. Inter-relationships between fields on a Data Entry Form are described by expressions that reference the corresponding tags. These expressions are stored in the Data Entry Form definition. The relationships between values entered in fields and Items in the Instance Graph are also described by expressions that reference the Data Entry Form tags and Item Names. These expressions are stored in the A Priori Graph.

B. Capsules

Referring back to FIG. 1, the Interface Engine 28 uses objects called Capsules to represent information obtained from the User 26. A Capsule is an object that represents a possible interaction with the User. It is the data structure used as the embodiment of the interface between the Interface Engine 28 and the Logic Engine 32. Capsules can be instantiated by the Logic Engine. The A Priori Graph 24 contains Capsules; the Instance Graph 34 contains Capsule Instances. Capsules represent the interactions available to the User 26 when the User is selecting components to configure. Each Capsule is associated with a user input window in the graphical user interface shown on the Display 30. The Capsule is tied to a Data Entry Form. It works as an I/O module to define and capture the User's input. Each Capsule Instance has a set of tags that identify the User's inputs. Thus, a Capsule Instance is a record defining the choices made in a given User/Configurator interaction. A Capsule Instance stores the data resulting from a particular user interaction. It contains a list of tags and associated values. The corresponding Item Instances are created by the Logic Engine via requests from the Interface Engine 28. Capsule Instances are linked into the Instance Graph but have no corresponding control flow.

Figure 13:
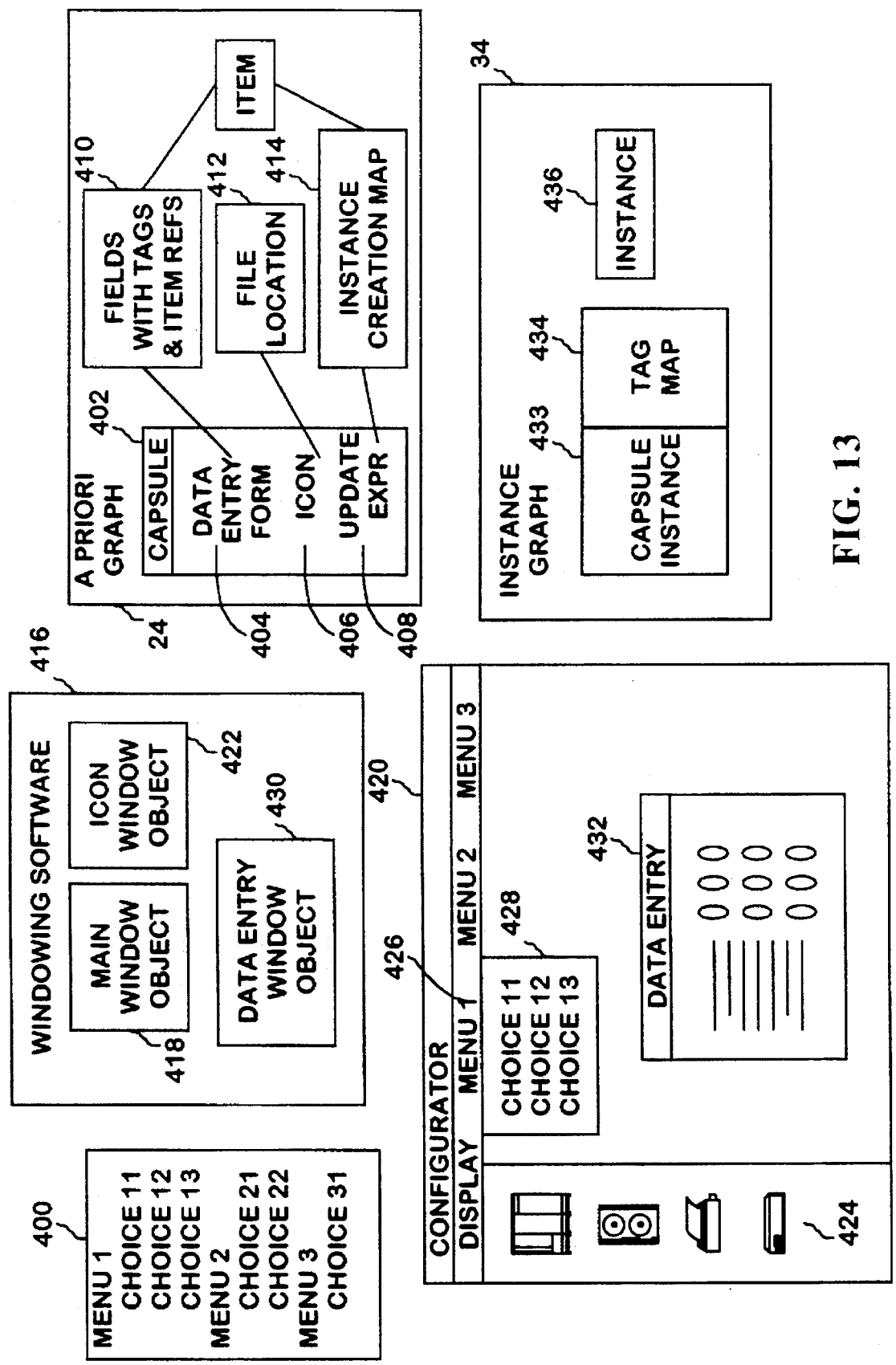
FIG. 13 is a block diagram illustrating the User/Interface Engine interaction.

FIG. 13 is a block diagram illustrating the User/Interface Engine interaction. The Interface Definition 400 of the Configurator Definition 12 is defined by the Developer 10. It consists of a menu hierarchy of possible user selections or choices in configuring a system. The Developer decides how many separate menus should exist, along with what choices are to be available under each menu. The menus and choices shown in FIG. 13 are for illustrative purposes only. Any combination and depth of menus and choices in the menu hierarchy could be specified by the Developer. Each leaf menu choice corresponds to a Capsule 402 in the A Priori Graph 24. A Capsule is specified in textual form according to the syntax discussed in detail in Appendix A below. It may include a Data Entry Form reference 404, an Icon reference 406, and an Update Expression 408. It may also include other Capsules. The Data Entry Form 404 specifies one or more Fields with Tags and Item references 410. Each Field represents a possible data value input by the User. Tags are unique identifiers for the data. Item references are links to the appropriate Item that the User is trying to populate with data. The File Location 412 is a location where the Icon bitmap is stored in the Configurator system. The Instance Creation Map 414 is a data structure that controls creating Item Instances in the Instance Graph 34 based on the Capsule 402 and the Developer-supplied Update Expressions and User-supplied data inputs.

Well-known Windowing software 416 is used to display pull-down menus, icons, User-selection buttons, etc. A Main Window Object 418 is created to represent the main window of the Configurator Display 420. Various Icon Window Objects 422 are created in Windowing software 416 to manage the icons 424 that represent possible User selections or commands. Each icon represents a type of component that can be configured.

Processing of User inputs proceeds as follows. The User selects a pull-down Menu such as Menu 1 426, as shown. The Interface Engine uses Windowing software 416 to display the Menu 1 choices. The User selects, for example, Choice 12 428, which may be a command to add a particular component to the current configuration. This choice has a corresponding Capsule definition 402. The Interface Engine uses the Data Entry Form definition 404 from the Capsule 402 to create a Data Entry Window Object 430. The Data Entry Window Object 430 manages the Data Entry window 432 presented to the User. The User makes configuration choices by selecting buttons displayed in the Data Entry window and entering text as needed. When the Data Entry window is displayed, a Capsule Instance 433 is created in the Instance Graph 34. This Capsule Instance 433 holds the data entered by the User for the Item being added to the configuration. The Tag Map 434 attached to the Capsule Instance 433 is updated with the User's inputs. The Capsule's Update Expression 408 is then evaluated by the Interface Engine 28 to create an Instance 436 for the User-selected Item.

X. PERSISTENT INFORMATION

Referring back to FIG. 1, the "persistent" information consists of the External Form 18 of the Configurator Definition 12, and the Instance Graph 34 of a specific configuration. The Instance Graph data may be saved in a file by the User and loaded again at a later point in time. This involves writing a text file (called the Persistent Data File) that contains an entry for each Instance with its name and linkages, the name of the A Priori object that it is an Instance of, and the Capsule fields and their values.

A saved Persistent Data File can be re-loaded in the context of the A Priori Graph 24 in which it was generated to re-create the configuration state as of the save time. This allows a User to interrupt a session of using the Configurator 16 at almost any time and to be able to resume it later. However, if packing processing is in progress, some additional state information must be saved. A Persistent Data File can also be used to represent a sub-configuration that may be needed in several places of a configuration. The Loader 22 ensures that the loaded instance names for a sub-configuration used more than once are unique. Persistent Data Files can also provide a convenient way to initialize an Instance Graph 34 when a configuration must always contain certain Instances.

As time progresses, the set of components supported by a given product set often changes. Old components may become unavailable and new components are introduced. The old Items must be removed from the A Priori Graph 24 when they are no longer available. But their Instances will still be present in the Persistent Data Files, which may be re-loaded at any time. To allow such loading to succeed, when an old Item is removed from the A Priori Graph, it is added to an Historical Database (not shown), along with rules that define how a User request for it is to be mapped into currently available Items.

If a Persistent Data File being loaded represents a configuration known to exist at a particular customer site, then it must be loaded without translating old Item Instances. If a Persistent Data File being loaded represents a configuration that is yet to be ordered, then the loaded form can only contain Items that may be currently ordered. In this case, any old Items must be translated by the Loader 22 during the loading process.

A generalized Configurator using declaratively constructed graphs and multiple interacting packers has been disclosed. A two-level, bi-partite, spreading activation graph is used as a declarative description of the objects to be configured and their associated relationships. The Configurator has the ability, when multiple packing problems interact, to dynamically select the most appropriate piece of the total configuration problem to work on at any point in time, while still taking into account the other packing problems. The Configurator provides the ability to define declaratively the constraints used by the packing activities to assure correct configuration results.

The ability to handle multiple interacting packing problems allows the Configurator to more consistently generate near-optimal configurations. The high level view provided by the declarative representation and explicitly constraints tends to separate the activity of building a configurator from the programming skills previously associated with such expert systems. Because a specialized configurator in described declaratively, it is easier to construct, enhance, and maintain. This reduces the amount of programming skills needed for configurator development, thus allowing people with a wider range of skills to contribute to the activity. At the same time, the generalized functionality increases the breadth of coverage that can be provided in the configurators.

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended claims.

APPENDIX A. EXTERNAL FORM SYNTAX DEFINITION

The following sections define the legal syntax of the External Form definition.

A.1 Global Definition

Although most aspect of Configurator definition can be described in terms of Items, Resources, and their relationships, some must be specified globally. These include:

Initialization of the Instance Graph

Aggregation of values from Item slots, wherever they occur in the A Priori Graph Propagation of Labels.

All of these aspects are defined in the context of a single, global object called a Knowledge Base.

Initialization

Initialization is specified by an Initialization.Actions slot. This slot contains an expression that can, for instance, load a predefined Instance Graph to efficiently create an initial state of the Configurator.

Aggregation

Aggregation provides a way of arranging all values of a particular type in the Instance Graph so that they are accessible for summation when needed. This can be useful, for instance, if it is necessary to compute the power or heat load imposed by a particular configuration. The method relies upon all relevant Items in the Instance Graph having a property of the same name. The value of the property should be the amount of this particular load imposed by an instance of this Item, measured in standardized units.

Aggregation then specifies the name of this slot, and has the effect that, as the A Priori Graph is loaded, all Items containing this slot are noted and made available for later summation.

Propagation

Propagation of Labels supports complex path definition for peripherals, or other situations in which information entered by the Configurator User at one point in the Instance Graph must be filtered and propagated to other parts of the Instance Graph. The basic idea is that a Label can be generated by the Interface Engine and attached to Instances as the are created. This Label will then be automatically distributed through the Instance Graph as propragation takes place, optionally being modified under Configurator Developer control as it is used to drive aspects of the configuration process. In the simplest cases, the Label can be a name, such as an identifier. In more complex areas, the Label can be a structured value consisting of a Mask and a Pattern. The Mask defines which part of the Pattern applies to the current Instance. The Pattern identifies names that apply to this part of the configuration.

For example, a dual-initiated channel could have a Pattern of (H1 H2). At the point of creation, the full Label would be (1 (H1 H2)). When, as propagation progressed, the connections to the channels were separated, the two connections would be labeled ((1 0) (H1 H2)) and ((0 1) (H1 H2)). The "1" indicates the piece of the Pattern applicable to the containing Instance. Both Mask and Pattern can be nested to arbitrary depth. A Consumes propagation with an attached Label will travel only to a Supplier with a matching Label or to one with none (whereupon it will receive the incoming Label). propagation is used to identify Properties that contain Label values and to cause their propagation.

A.2 Object Definition

{Capsule|Item|Resource|Set|Package}<name>

An object in the External Form may be a Capsule, Item, Resource, Set or Package. This statement introduces the definition of the named type of object. The <name> is a name chosen by the Configurator Developer to identify the defined object. One or more Capsule, Item, Resource, Set, or Package definition statements may follow this statement.

End <object-type>

This statement terminates the definition of an object. An End statement is required of each object definition.

A.3 Capsule Definition

The following statements may occur after a Capsule:

Contains <item-name>|<capsule-name>[,<item-name>|<capsule-name>]...

This statement specifies that the Capsule contains one or more named Items and/or Capsules.

Icon

This statement specifies the bitmap that represents the Capsule on the display.

Data.Entry.Form

This statement specifies the Data Entry Form that allows the User to enter the desired characteristics of the Capsule.

Update.Net

This statement specifies the expression that is to be evaluated in order to control the entry into the Instance Graph of the results implied by the Configurator User's selections on the current Data Entry Form. When a Data Entry Form is completed, this expression is evaluated. It should specify the names of the Items that are to be instantiated, their corresponding quantities, and whether instances created by previous interactions with this Data Entry Form are to be removed. For these purposes, three statements exist that communicate the information from the expression to the Interface Engine: Select, Number, and Rebuilt.

External <internal-name>[as <new-external-name>]. ..

This statement defines names that are used internally to this Capsule that are to be made available to other Capsules, optionally renamed.

Endcapsule

This statement terminates the definition of the Capsule. Note that a Capsule may or may not be instantiated in the Instance Graph. If an uninstantiated Capsule is referenced in a context in which an instance is required, the reference is interpreted to access the appropriate instance of an Item contained in the Capsule. Note also that Items listed as contained must actually be present once the A Priori Graph is fully loaded. The load process will validate that no Items that are not loaded are referenced.

A.4 Item Definition

In the following sections, both Supplies and Consumes allow specification of "Modifiers." There is a general syntax that allows Configurator Developers to define and reference their own Modifiers. For Supplies, this allows definition of an identifier with one or more associated value(s); for Consumes, it allows reference to an identifier defined on the corresponding Supplies. The meaning of a Consumes reference is that consumed instances should conform to the values associated with the identifier on the Supplies statement. The form of an identifier is a list of two names; the intention is that the first name be a "group" name, and the second name be a qualifier within its group. The values on Supplies references are expressions that are evaluated each time they are needed for attaching a new Resource instance; once an instance is attached, its expression value does not change.

The following statements may occur after an Item:

Supplies <resource-use>|<supplies-modifiers>|

This statement specifies the quantity of the named Resource supplied by the item that contains it. If an Item supplies multiple Resources, multiple Supplies statements should be given. Each Instance of the Item supplies all of the listed resources.

Consumes <resource-use>[<consumes-modifiers>]

This statement specifies the quantity of the named Resources consumed by the Item that contains it. If the Item consumes multiple Resources, multiple Consumes statements should be given. Each Instance of the Item consumes all of the listed Resources. The consumes-modifiers define properties of the Resource that control aspects of its configuration. Multiple consumes-modifiers are allowed. In addition to the general group/qualifier notation, valid modifiers include Separate, Prefer, (Mask Split), (Mask Extract).

Separate [until <Property-name>]

Separate specifies that the connections of the Instances of this Item must be split between different Resources, even if that requires components to be added to the configuration. The until <Property-name> phrase limits the scope of application of Separate to Items encountered in the propagation path up to and including the Item on which <Property-name> is defined.

Prefer {Separate|<Item-name>}

Prefer indicates that separation of the instance connections of the Item is preferred if the needed Resources will, in any case, be configured, but that additional resources should not be configured simply in order to achieve this separation.

(Mask Split) <Label-name>

This modifier indicates that the given Label is to be divided into as many pieces apply to the Instances generated by propagation from this Instance. Each generated Instance is to be given one piece, and their Masks are to be adjusted to show that this has been done. For example, if the incoming Label is (1 (H1 (h1 H2) A 0)), then three Instances will be generated by propagation, and they will be labeled ((1 0 0) (H1 (H1 H2) A ())), ((0 1 0) (H1 (H1 H2) A ())), and ((0 0 1) (H1 (H1 H2) A ())), respectively.

(Mask Extract) <Label-name>

This modifier indicates that the Mask of the incoming Label is to be applied to its Pattern to yield a simpler value, which is then to be propagated. For example, if the incoming Label is ((1 0 0) (H1 (H1 H2) A ())), then the extracted value will be H1; if it is ((0 1 0) (H1 (h1 H2) A ())), then the extracted value will be (1 (h1 H2)).

Classification <superset><classification-function>

The presence of a Classification statment on an Item implicitly invokes processing on an instance of the Item at creation/connection time to place it into the set specified by the result of calling the classification-function. If this set does not already exist it will automaticaly be created and made a sub-set of superset. There is a limitedcollection of pre-defined classification-functions that can be user; they return the name of the set that is to contain the current instance.

Constraints <boolean-expression>[,<boolean-expression>]. . .

This statement specifies one or more constraints that apply to configuration of the Item that contains it. If multiple boolean-expressions are given, all of the constraints must be satisfied for each Instance of the Item.

Manual Constraints <boolean-expression>[, <boolean-expression>]. . .

This statement specifies the constraints that apply to manual configuration of the Item that contains it. These constraints can be less restrictive than those entered under Constraints; they are used instead of the constraints when the Configurator User manually controls placement of an Item.

Enable <boolean-expression>

This statement specifies an expression returning T or NIL that permits the Selection Proposer of the attached Packer to generate proposals (if the value is NIL, no proposals will be generated). This statement provides a means to defer selected Packer actions until others have constructed some pre-requisite parts of the Instance Graph.

Property <property-name><property-value>[, <property-name><property-value<]. . .

This statement specifies property-values for the Item. A Configurator Developer is free to define property-names to satisfy Configurator needs. Property-values can be numbers or strings.

Packer

This property is pre-defined to support placement functionality and should not be re-used. The property-value specifies the name of the object that provides packing capability of this item.

Aggregated

This property specifies that the Resources consumed by this Item are to be represented by a single aggregate Instance with an appropriate count (rather than by the specified number of separate Instances, as would otherwise be done). This property can be used in cases where large numbers of the Item are likely to be requested, and has space and time implications for the Instances Graph.

Beginner.Completer

Ender.Completer

These properties specify the names of Items to be used at the state and end (respectively) of chains of Items built by special purpose "chaining" Packers. A Beginner.Completer can take the form of a list. The members of the list identify, in sequence, working away from the requesting Resource, the components that are to be configured at the start of the chain. Components of this list can themselves be lists; the meaning is that the members of the inner list are to be configured in parallel, attached to the Resources of the preceding entry.

Limit <numeric-expression>

A Limit expression specifies the computation of the maximum number of the containing Item that can be configured.

Absolute.Limit

An Absolute.Limit expression specifies an Item quantity that cannot be exceeded under any circumstances.

Enditem

This statement terminates the definition of the Item.

A.5 Resource Definition

In most cases, Resources are defined implicitly by being mentioned in the Supplies and Consumes clauses of Items. It may be necessary in some circumstances to describe some characteristics of a Resource explicitly. This is accomplished by specifying a Resource statement. This statement can be followed by the Supplies, Consumes, or Property statements.

Supplies <resource-use>

This statement specifies the quantity of the named Item supplied by the Resource that contains it. If a Resource supplies multiple Items, multiple Supplies statements should be given. Each Instance of the Resource supplies all of the listed Items.

Consumes <resource-use>

This statement specifies the quantity of the named Item consumed by the Resource that contains it. If the Resource consumes multiple Items, multiple Consumes statements should be given. Each Instance of the Resource consumes all of the listed Items.

Property <Property-name><Property-value>

The valid <Property-names> are as follows:

Combination-rule

Combination-rule can have maximum as its <Property-value>. Requirements for a single type of Resource coming from multiple Items are by default combined by addition. This Property overrides that rule, specifying that they should be combined by taking the largest single value instead.

Positional

This Property specifies that positioning of these Resource Instances within their container is significant.

Reusable

This Property specifies that, as against the normal procedure of a single Resource being consumed by a single usage, the Resource can be reused by multiple usages without being used up.

No.Group

This Property specifies that, as propagation takes place in the Instance Graph, Instances of this Resource are not to be grouped with Instances of other Resources when queued for Packing. The effect is that all Instances of Resources with this Property from a given Item are treated independently by the Packers.

Into.Dev

This Property identifies for the "Cable" Packer the connection that is to be considered to go "into" the component (instead of coming out of it).

Endresource

This statement terminates the definition of the Resource.

A.6 Set Definition

A Set is a collection of Items. Its purpose is to allow one of several similar Items to be chosen in terms of current needs as configuration of a system proceeds. It allows the choice to be re-made as needs change during the configuration process. The definition is a list of Items that are members of the Set. The effect of encountering this definition at load time is that the normal A Priori Graph Consumes/Supplies links to these Items are diverted to go to and from the Set. The original links are saved and named Set.Consumes and Set.Supplies. Sets are processed by the Logic Engine and the Packing Engine. A Set is defined by the following:

Contains <Item-name>, <Item-name>, . . .

Endset

A.7 Resource-use Definition

A Resource-use is specified as follows:

<Count-spec>{<Resource-name>|<Item-name>}

When a Resource-use is allowed, its form is a numeric count and a name of a Resource (in an Item) or of an Item (in a Resource). The <Count-spec> and the <Resource-name> or <Item-name> can be general expressions that return the appropriate type of value. If the <Count-spec> is zero or the <Resource-name> or <Item-name> is null, no Instance is created and no propagation takes place over this connection. When expressions are used they are evaluated for a given Instance at the time the Instance Graph propagation first needs them for that Instance; they are not automatically re-evaluated subsequently, even if the condition on which they depend changes.

APPENDIX B. EXTERNAL FORM EXAMPLE

```
MODULE ASERIES_NET
© 1994 Unisys Corporation
CAPSULE INITIALIZATION
    ACTIONS        "(\"LOAD.INSTANCES \\\"expf:uwproto;aseries_inip.text\\\"\")"
ENDCAPSULE INITIALIZATION
ITEM DISK-USR4000
    PROPERTY       ICON.VARIABLE    *USR4000BM*
    PROPERTY       ICON.FILE        "expf:uwproto;usr4000bm.lisp"
    PROPERTY       DATA.ENTRY.FORM  DISK-USR4000.DEF
    UPDATE.NET     "(\"IF (chantype $delta$) THEN (rebuild)\"
+\"IF (cnt419 >0) THEN ((SELECT 4000.ncdisk) (NUMBER cnt419))\"
+\"IF (cnt805 >0) THEN ((SELECT 4000.dpdisk) (NUMBER cnt805))\"
+\"IF (cnt1545c >0) THEN ((SELECT 4000.cdisk) (NUMBER cnt1545c))\"
+\"IF (cnttape >0) THEN ((SELECT 4000.tape) (NUMBER cnttape))\")"
    CONTAINS       (4000CHAN 4000DLP)
ENDITEM DISK-USR4000
ITEM 4000CHAN
    CONSUMES       1    SCSICHANNELR
    CONSUMES       3    CABINET_U
    CONSUMES       1    PDU_SOCKETS
    CONSUMES       15   PDU_CURRENT
ENDITEM 4000CHAN
ITEM 4000DLP
    CONSUMES       1    SCSIDLPR
    CONSUMES       3    CABINET_U
    CONSUMES       1    PDU_SOCKETS
    CONSUMES       15   PDU_CURRENT
ENDITEM 4000DLP
ITEM SCSI.CABLE
    LENGTH.CONSTRAINTS "((<=
+ (+ (COLLECT (PROPERTY.VALUE LENGTH)
+      (CHAINED.INSTANCE.VALUES SCSI.CABLE (SCSI.INC SCSI.OUTC))))
+ 82))"
    PROPERTY       PACKER      SCSI.CABLING.OP
    PROPERTY       ENDER.COMPLETER  SCSITERM
    PROPERTY       BEGINNER.COMPLETER SCSICHANNELNEW
    CABLE          (SCSI.INC SCSI.OUTC)
    SUPPLIES       1    SCSI.INC
    SUPPLIES       1    SCSI.OUTC
    CONSTRAINTS    "((AND(<=(COUNT (CHAINED.INSTANCE.VALUES
+               (4000.PORT1 4000.PORT2)
+               (SCSI.INC SCSI.OUTC))) 1)
+   (OR
+     (=
+      (COUNT
+       (CHAINED.INSTANCE.VALUES ((4000.TAPE (4000.PORT1CONN
          4000.PORT2CONN))) (SCSI.INC SCSI.OUTC))) 0)
+   (OR
+     (=
+      (COUNT
+       (CHAINED.INSTANCE.VALUES ((4000.CDISK (4000.PORT1CONN
          4000.PORT2CONN))) (SCSI.INC SCSI.OUTC))) 0)
+   (<=
+     (COUNT
+      (CHAINED.INSTANCE.VALUES
+       (SCSICHANNELNEW ((4000.CDISK 4000.NCDISK 4000.TAPE 4000.DPDISK)
+           4000.PORT1CONN)
+       ((4000.CDISK 4000.NCDISK 4000.TAPE 4000.DPDISK) 4000.PORT2CONN))
+       (SCSI.INC SCSI.OUTC))) 8)
+   (DIFFERENT
+     (CHAINED.INSTANCE.VALUES ((4000.DPDISK (4000.PORT1CONN
          4000.PORT2CONN)))
+     (SCSI.INC SCSI.OUTC)))))"
ENDITEM SCSI.CABLE
RESOURCE SCSI.INC
    PROPERTY       INTO.DEV    T
    PROPERTY       NO.GROUP    T
ENDRESOURCE SCSI.INC
RESOURCE SCSI.OUTC
    PROPERTY       NO.GROUP    T
ENDRESOURCE SCSI.OUTC
ITEM SCSITERM
    ENABLE         "(PLUG)"
    CONSUMES       1    SCSI.INC
ENDITEM SCSITERM
ITEM SCSICHANNELNEW
    ENABLE         "((IF (CHECK.PATH CAM UP CHANNEL_POSITION CMU
       CAM-POSITION)
```

APPENDIX B. EXTERNAL FORM EXAMPLE

```
+ (INSTANCE.VALUES CABINET_U UP CHANNEL_POSITION CMU
    CAM_POSITION CAM)
+ T))"
    CONSUMES        1    CHANNEL_POSITION
    CONSUMES        1    SCSI.OUTC
ENDITEM SCSICHANNELNEW
ITEM 4000.TRAY
    PROPERTY   PACKER 4000.TRAYPACKING.OP
    SUPPLIES        1    4000.PORT1R
    SUPPLIES        1    4000.PORT2R
    CONSTRAINTS     "((AND
+ (EVERY
+ (=(INSTANCE.VALUES 4000.TRAY UP 4000.PORT1CONN 4000.PORT1
    4000.PORT1R)
+ (INSTANCE.VALUES 4000.TRAY UP 4000.PORT2CONN 4000.PORT2
    4000.PORT2R))
+ (INSTANCE.VALUES 4000.DPDISK 4000.PORT2R 4000.PORT2
    4000.PORT2CONN))))"
    CONSUMES        4    CABINET_U
+ (AND (ANY.INSTANCES.OF 4000.TAPE 4000.PORT1R 4000.PORT1
+       4000.PORT1CONN)
+ (POSITION FRONT.ACCESS))
    CONSUMES        2    PDU_SOCKETS
    CONSUMES        20   PDU_CURRENT
ENDITEM 4000.TRAY
ITEM 4000.TAPE
    CONSUMES        1    4000.PORT1CONN
ENDITEM 4000.TAPE
ITEM 4000.NCDISK
    CONSUMES        1    4000.PORT1CONN
ENDITEM 4000.NCDISK
ITEM 4000.CDISK
    CONSUMES        1    4000.PORT1CONN
ENDITEM 4000.CDISK
ITEM 4000.DPDISK
    CONSUMES        1    4000.PORT1CONN
    CONSUMES        1    4000.PORT2CONN
ENDITEM 4000.DPDISK
ITEM 4000.PORT2
    PROPERTY    PACKER 4000.PORT2PACKING.OP
    ENABLE      "((IF (CHECK.PATH 4000.TRAY UP 4000.PORT2R)
+ (INSTANCE.VALUES CABINET_U UP 4000.PORT2R 4000.TRAY)
+ T))"
    SUPPLIES        5    4000.PORT2CONN
    CONSUMES        1    4000.PORT2R
    CONSUMES        1    SCSI.INC
    CONSUMES        1    SCSI.OUTC
ENDITEM 4000.PORT2
ITEM 4000.PORT1
    PROPERTY    PACKER 4000.PORT1PACKING.OP
    ENABLE      "((IF (CHECK.PATH 4000.TRAY UP 4000.PORT1R)
+ (INSTANCE.VALUES CABINET_U UP 4000.PORT1R 4000.TRAY)
+ T))"
    SUPPLIES        5    4000.PORT1CONN
    CONSTRAINTS     "((AND
+ (INCOMPATIBLE (4000.CDISK 4000.PORT1CONN)
+       ((4000.NCDISK 4000.TAPE 4000.DPDISK) 4000.PORT1CONN))))"
    CONSUMES        1    4000.PORT1R
    CONSUMES        1    SCSI.INC
    CONSUMES        1    SCSI.OUTC
ENDITEM 4000.PORT1
ITEM SSCSICHANNEL
    SUPPLIES        1    SSCSICHANNELR
    CONSUMES        1    CHANNEL_POSITION
ENDITEM SSCSICHANNEL
ITEM SCSICHANNEL
    SUPPLIES        1    SCSICHANNELR
    CONSUMES        1    CHANNEL_POSITION
ENDITEM SCSICHANNEL
ITEM SSCSIDLP
    SUPPLIES        1    SSCSIDLPR
    CONSUMES        1    BASE_SLOTS
    CONSUMES        71   BASE_CURRENT
ENDITEM SSCSIDLP
ITEM PDU
    PROPERTY    PACKER PDUPACKING.OP
    SUPPLIES        16   PDU_SOCKETS
    SUPPLIES        240  PDU_CURRENT
```

APPENDIX B. EXTERNAL FORM EXAMPLE

```
    CONSUMES         3    CABINET_U
ENDITEM PDU
ITEM CABINET
    PROPERTY         PACKER CABINETPACKING.OP
    SUPPLIES         36   CABINET_U
+ (((POSITION FRONT.ACCESS) (RANGE 9 26)))
        CONSTRAINTS "((AND (=
+ (COLLECT.VALUES (INSTANCE.VALUES CABINET UP CABINET_U)
+         (GET.INSTANCES (SYSTEM_MODULE CAM SCP))))
+ (EVERY (CONTAINED (POSITION.RANGE) (RANGE 9 26))
+     (SELECT (ANY.INSTANCES.OF 4000.TAPE 4000.TRAY 4000.PORT1R
+         4000.PORT1 4000.PORT1CONN)
+         (INSTANCE.VALUES CABINET_U)))
+ (=
+ (COUNT
+    (SELECT
+    (ANY.INSTANCES.OF 4000.TAPE 4000.TRAY 4000.PORT1R
+         4000.PORT1 4000.PORT1CONN))
+    (INSTANCE.VALUES CABINET U))))
+ 0)))"
ENDITEM CABINET
RESOURCE CABINET_U
    PROPERTY         POSITIONAL      T
ENDRESOURCE CABINET_U
ITEM SYSTEM_MODULE
    SUPPLIES         1    SYSTEM_CONNECTION
    ABSOLUTE.LIMIT (1)
    CONSUMES         8    CABINET_U
    CONSUMES         1    SCPR
ENDITEM SYSTEM_MODULE
ITEM CAM
    PROPERTY         PACKER CAMPACKING.OP
    SUPPLIES         2    CAM_POSITION
    CONSUMES         1    SYSTEM_CONNECTION
    CONSUMES         5    CABINET_U
    CONSUMES         1    PDU_SOCKETS
    CONSUMES         50   PDU_CURRENT
ENDITEM CAM
ITEM CMU
    PROPERTY         PACKER CMUPACKING.OP
    SUPPLIES         4    CHANNEL_POSITION
 CONSTRAINTS "((AND
+ (<=
+ (COUNT (INSTANCE.VALUES (SCSIDLP SSCSIDLP)
+         CHANNEL_POSITION BASE BASE_SLOTS)) 12)
+ (<=
+ (COUNT (INSTANCE.VALUES CHANNEL_POSITION
+     BASE BASE_SLOTS)) 1)
+ (<=
+ (COUNT
+    (SELECT (INSTANCE.VALUES (SCSIDLP SSCSIDLP) BASE_SLOTS)
+        (INSTANCE.VALUES BASE CHANNEL_POSITION))) 3)))"
    CONSUMES         1    CAM_POSITION
ENDITEM CMU
ITEM BASE
PROPERTY         PACKER    BASEPACKING.OP
SUPPLIES         14   BASE_SLOTS
SUPPLIES         800  BASE_CURRENT
CONSUMES         9    CABINET_U
CONSUMES         1    PDU_SOCKETS
CONSUMES         60   PDU_CURRENT
ENDITEM BASE
ITEM SCSIDLP
    SUPPLIES         1    SCSIDLPR
    CONSUMES         1    BASE_SLOTS
    CONSUMES         71   BASE_CURRENT
ENDITEM SCSIDLP
CAPSULE DISKS
    CONTAINS         (DISK-USR4000)
ENDCAPSULE DISKS
ITEM SCP
    SUPPLIES         1    SCPR
    ABSOLUTE.LIMIT (1)
    CONSUMES         5    CABINET_U
    CONSUMES         1    MAINTCHANNELR
ENDITEM SCP
ITEM MAINTCHANNEL
    SUPPLIES         1    MAINTCHANNELR
```

-continued

APPENDIX B. EXTERNAL FORM EXAMPLE

```
    CONSUMES        1    CHANNEL_POSITION
ENDITEM MAINTCHANNEL
ITEM DCHA_CARD
    SUPPLIES        5    WEIGHT
    SUPPLIES        3    CARD_POSITION
    CONSUMES        1    BASE_SLOTS
    CONSUMES      100    BASE_CURRENT
ENDITEM DCHA_CARD
ENDMODULE ASERIES_NET
```

APPENDIX C. GLOSSARY

Arc A connection between Nodes in a Graph, Implemented in Configurator software by a Linkage Pointer.

Argument A Parameter passed to a Function.

Binding (or "Re-bound") The association of a Variable with a value. To Re-bind a Variable is to give the Variable a new value.

Bi-partite (as applied to a Graph (Consisting of two different types of Node such that every Arc joins a Node of one type to a Node of the other type.

Component An identifiable object (usually in this context a piece of hardware) that must be ordered and/or influences the Configuration process.

Configuration 1) The collection of components needed to satisfy a User's requests.
2) The process of building (1)—more precisely, "Configuration Process."

Constraint A limitation on the generally with which Components can be configured—e.g., A cabinet provides only a limited amount of space that can be occupied. A single Constraint can involve several Components, a single Component may have several Constraints, and multiple Constraints on one or more Components can interact in complex ways.

Consume In this context, the process of one Item that depends on another using up some of the other's Resources (c.f. Supply).

Control In a program Execution, the Point of Control is the instruction or statement that is being Executed. By extension, in Spreading Activation it is the latest Node that has been reached in the Propagation Deadlock The situation in which one program activity has acquired some capability A and needs B, and another program activity has acquired capability B and needs A. No further work will be done by these activities until one or both relinquish the capability acquired.

Declarative A form of Syntax in which definitions are given in terms of state rather than in terms of process. It avoids the developer having to define the sequential logic of a program.

Evaluation The process performed by an Expression Handler in interpreting an Expression to produce its Return value.

Execution The process of carrying out a program or of interpreting an Expression.

Expression A combination of Functional Calls and Arguments that fan be Evaluated to produce some needed result. "(+1 2)" is a simple Pre-fix Form Expression whose result is 3.

Expression Handler A program capable of Evaluating an Expression to produce its Return value.

Flow As Control moves from one instruction, statement, or Node to another it is said to Flow, especially through a longer sequence of points.

Fully Parenthesized In some notations it is possible to write an Expression in which the Evaluation sequence is defined partly by convention rather than explicitly, e.g., (1+2*3) is conventionally understood to means 7 rather than 9. In Fully Parenthesized form all sequencing is explicit, e.g., the above Expression would be written (1+*2*3)).

Function A program that accepts a small number of Arguments and generates a Return value using them.

Function Call 1) The process of Control Flow entering a Function.
2) The written code that causes (1) to take place.

Functional Language A style of programming language in which all work is carried out by means of Function Calls that Return a value, as against a Statement Language in which many actions provide no Return value and so cannot be composed.

Grammar A set of rules that define how elements of a language can be combined. An Expression Grammar defines how primitive values can be combined into legal Expressions. The existence of a Declarative grammar creates the possibility of describing computations other than by program code.

Graph A network of Nodes interconnected by bi-directional Arcs—in this context, typically drawn with the Nodes as rectangles or ovals and the Arcs as lines connecting them.

Item In the context of this document, a Node in the Graph representing a Component, drawn as a rectangle.

Legal Actions permitted by all the defined Constraints and Resource limitations. With respect to a Configuration, the system could be build and would work to the extend that this is defined by the Graph.

Linkage A connection between two Objects such that it is straightforward to find open from the other. Usually implemented by a Pointer (c.f. Two Way Linkage).

List An ordered collection of values of indeterminate length, conventionally written with surrounding parentheses, e.g., (A B C). Lists can contain Lists.

Literal A programming term for a value that represents itself, e.g., a number or a string of characters. Contrast with a Variable, which is a name that represents different values at different times, depending on the execution state of the program.

Loading The process of reading information from permanent file storage and making it available in memory for program use. Can be a simple copying process, or can involve transformations and building of Linkages.

Look Ahead The process of exploring in detail the implications of a choice already tentatively made, in this context to determine if there are foreseeable adverse consequences of the choice.

Near-Optimal Good enough to be satisfactory. Not necessarily (although quite possibly) the ideal, but avoiding all obvious problems, and being better than most humans would achieve. Referred to elsewhere as "satisficing" (c.f. Sub-optimal).

Nested Applies to Expressions in a Functional Language. The meaning is that one Expression can contain another (sub-) Expression within it. "Arbitrarily Nested" means that Nesting can take place any desired number of times, e.g., (1+(2*(3/(4−5)))).

Node A point in a Graph at which several Arcs meet. Implemented in Configurator software by an Object.

Object A software term for an encapsulation of code and data that provides a useful abstraction.

Packing 1) The process of arranging some set of Components in relation to another Component so as to satisfy the constraints that govern the relationship(s) and in terms of some goodness of fit criteria (usually as near as possible in an optimum way). 2) The results of (1).

Packing Boundary A characteristic of Configuration Packing processes is that adding one more component does not, usually, make a large change in the result. Repeatedly adding one more Component eventually will make a large change (e.g., a Cabinet becomes full, so a new one must be configured). The point at which a large change is required is a Packing Boundary.

Paradigm A pattern, example, or model. A Control Paradigm is the overall control structure of a (piece of a) program; it defines how different parts of the program relate together, and what combinations of actions are possible.

Parameter An entity that controls some operation. Sometimes, a piece of data passed to a Function to be operated on or to control, the Function's operations.

Parsed Analyzed from its original form into the constituents that are useful for computerized processing.

Partitioned Divided into several pieces. Part of the art of programming is to Partition the functionality and data so that each individual piece is coherent and meaningful in itself, and that the totality of the pieces together solves the problem that is being addressed.

Pre-fix Form Conventionally, arithmetic Expressions are written in Infix form, where the operator occurs between the values it applies to, e.g., (1+2). It is possible in a Fully Parenthesized syntax to place the operator in front of all the values it applies to, e.g., (+1 2). This has the advantages that a single operator can then be applied to an indefinite number of values, e.g., (+1 2 3 4), and that the number of values need not be known in advance.

Processing Sequence A fixed order in which processing operations are performed.

Propagation Describes the progress of Control Flow in Spreading Activation, where the locus of Control Propagates Node by Node through the Graph.

Property A value associated with an Object. Typically a Property has a name by which it is referenced, and a changeable value associated with the name. One of the defining characteristics of an Object is the set of Properties it contains.

Repack To remove from the Instance Graph all Instances that were not directly requested by the User (i.e., the ones that were configured to support these), and to re-execute the propagation and packing of the remaining Instances to produce a new total configuration. This normally produces a more-optimal configuration because of the freedom the system has to choose the sequence in which the Instances are processed.

Representation A set of concepts embodied in data formats and code in a computer program that allow the program, by applying the code to some data conforming to the defined formats, to produce results of value in the real world. The chosen representation(s) determine the scope of applicability of the program.

Resource In the context of this document, a capability Supplied and Consumed by Items that is not itself a Component but which influences the Configuration of Components (e.g., Slots in a Card Cage).

Return The final stage in the Execution of a Function. The flow of control goes back to the point at which the Execution of the Function was invoked, and a value, the result of the Function, is transmitted back to that point.

Spreading Activation A control Paradigm in which processing starts at some Node in a Graph an travels from there to the Nodes directly connected by Arcs to the starting Node, and from there to the next set of directly connected Nodes (ignoring the Arc of entry), etc.

Sub-optimal Not reaching the standard of Near-Optimal, generally in some rather obvious way.

Supply In this context, the process of one Item providing Resources needed by others (c.f. Consume).

Syntax Linguistic form in which information can be expressed, typically consisting of pre-defined keywords, and place holders that can be filled in as necessary by Users.

Two Way Linkage A pair of connections between two Objects such that it is straightforward to find either from the other one (c.f. Linkage).

Weight A numerical value used to represent desirability or relative importance in a program.

What is claimed is:

1. An expert system using control logic based on spreading activation and graphs as a knowledge representation for generating a value configuration of connected components, said expert system comprising:

a priori net means for storing component definitions declaratively specified by a configurator developer, wherein said component definitions and the implied requirements of their use are represented as first nodes in a first spreading activation bi-partite graph;

instance net means for storing instances of components defined in said a priori net means interactively selected by a configurator user, wherein said instances and the interconnections between said instances are represented as second nodes in a second bi-partite graph; and processing means coupled to said a priori net means and said instance net means for accepting requests from the configurator user to configure selected components, matching said configurator user requests to said component definitions, automatically propagating logical implications of said configurator user requests across as many ones of said first nodes of said first spreading activation bi-partite graph and said second nodes of said second bi-partite graph as are required to build a complete set of connected components fulfilling said configurator user requests by creating and connecting selected instances of said selected components only if creation and connection of said selected instances are valid based on said component definitions in said a priori net means and prior configurator user requests, and reporting the configuration resulting from said configurator user requests to the configurator user.

2. The expert system as in claim 1, further comprising loader means coupled to said a prior net means for converting said component definitions specified by the configuration developer from a text-based external format to a bi-partite graph-based internal format, and for loading said component definitions represented in said bi-partite graph-based internal format into said a priori net means.

3. The expert system as in claim 2, further comprising interface means coupled to said processing means for accepting said requests to configure selected components from the configurator user, for forwarding said requests to said processing means, and for displaying the configuration received from said processing means to the configurator user.

4. The expert system as in claim 3, further comprising a net definition knowledge base means referenced by said loader means and said processing means, said net definition knowledge base means having at least one piece of knowledge relating to each type of objects that may represent said component definitions.

5. The expert system as in claim 4, wherein said processing means determines the validity of said requests to connect said selected components by analyzing the relationships between said first nodes in said first spreading activation bi-partite graph and said second nodes in said second bi-partite graph, said first and second nodes being selected by automatically performing spreading activation logic on said first spreading activation bi-partite graph and said second bi-partite graph.

6. A non-rule-based configurator expert system expert using control logic based on spreading activation and graphs as a knowledge representation for generating a complete, valid, near-optimal configuration of connected components, the configurator expert system being customized for a given configuration domain by a configurator developer, and operated by a configurator user to generate a configuration solution based on user requests and predetermined component requirements and connection constraint expressions contained in component definitions, said non-rule-based configurator expert system comprising:

an a priori net containing component definitions declaratively specified by the configurator developer, wherein said component definitions and the implied requirements of their use are represented as first nodes in a first spreading activation bi-partite graph;

an instance net containing instances of components defined in said a priori net interactively selected by the configurator user, wherein said instances and the interconnection between said instances are represented as second nodes in a second bi-partite graph; and a logic engine coupled to said a priori net and said instance net, wherein said logic engine accepts requests from the configurator user to connect selected components, matches the configurator user requests to said component definitions stored in said a priori net, automatically propagates logical implications of configurator user requests across as many ones of said first nodes of said first spreading activation bi-partite graph and said second nodes of said second bi-partite graph as are required to build a complete set of fully interconnected components fulfilling said configurator user requests by creating and connecting selected instances of configurator user.

7. The non-rule-based configurator expert system as in claim 6, further comprising a loader module coupled to said a priori net to convert said component definitions specified by the configurator developer from a text-based external format to a graph-based internal format, and load said component definitions represents in said graph-said internal format into said a priori net.

8. The non-rule-based configurator expert system as in claim 7, further comprising an interface module coupled to said loader module and said logic engine, wherein said interface module receives said component definitions from the configurator developer, forwards said component definitions to said loader module, accepts said requests to connect selected components from the configurator user, forwards said requests to said logic engine, and displays the configuration received from said logic engine to the configurator user.

9. The non-rule-based configurator expert system as in claim 8, further comprising a net definition knowledge base referenced by said loader module and said logic engine, said net definition knowledge base having at least one piece of knowledge relating to the type of objects that may represents said component definitions.

10. The expert system as in claim 9, wherein said logic engine determines the validity of said requests to connect said selected components by analyzing the relationships between nodes contained in said first spreading activation bi-partite graph and said second bi-partite graph, said first and said second nodes being selected by automatically performing spreading activation logic on said first spreading activation bi-partite graph and said second bi-partite graph.

11. A non-rule-based configurator expert system using control logic based on spreading activation and graphs as a knowledge representation for generating a valued configuration of components connected to form a computer system, said non-rule-based configurator expert system comprising:

a priori net means for storing computer system component definitions declaratively specified by a configurator developer, wherein said component definitions and the implied requirements of their use are represented as first nodes in a first spreading activation bi-partite graph;

instance net means for storing instances of computer system components defined in said a priori net means interactively selected by a configurator user, wherein said instances and the interconnections between said instances are represented as second nodes in a second bi-partite graph; and processing means coupled to said a priori net means and said instance net means for accepting requests from the configurator user to configure selected computer system components, matching said configurator user requests to said computer system component definitions stored by said a priori database means, automatically propagating logical implications of configurator user requests across as many ones of said first nodes of said first spreading activation bi-partite graph and said second nodes of said second bi-partite graph as are required to build a complete set of connected computer system components fulfilling said configurator user requests by creating and connecting selected instances of said selected computer system components in said instance database means only if creation and connection of said selected instances are valid based on said computer system component definitions in said a priori net means and prior configurator user requests, and reporting the configuration resulting from said configurator user requests to the configurator user.

12. The non-rule-based configurator expert system as in claim 11, further comprising loader means coupled to said a priori net means for converting said computer system component definitions specified by the configuration developer from a text-based external format to a graph-based internal format, and for loading said computer system component definitions represented in said graph-based internal format into said a priori net means.

13. The non-rule-based configurator expert system as in claim 12, further comprising interface means coupled to said processing means for accepting said requests to said processing means, and for displaying the configuration received from said processing means to the configurator user.

14. The non-rule-based configurator expert system as in claim 13, further comprising a net definition knowledge base means coupled to said loader means and said processing means, said net definition knowledge base means having at least one piece of knowledge relating to each type of objects that may represent said computer system component definitions and referenced by said loader means and said processing means.

15. The non-rule-based configurator expert system as in claim 14, wherein said processing means determines the validity of said requests to connect said selected computer system components by analyzing the relationships between said first nodes in said first spreading activation bi-partite graph and said second nodes in said second bi-partite graph, said first and second nodes being identified by automatically performing spreading activation logic on said first spreading activation bi-partite graph and said second bi-partite graph.

16. A computer-based, non-rule-based configurator expert system using control logic based on spreading activation and graphs as a knowledge representation for generating a complete, valid, near-optimal configuration of connected components, the configurator expert system being customized for a given configuration domain by a configurator developer, and operated by a configurator user to generate a configuration solution based on configurator user requests, predetermined component requirements and connection constraints contained in component definitions, said computer-based, non-rule-based configurator expert system comprising:

an a priori net representing component definitions declaratively specified by the configurator developer, said component definitions being logically coupled to resources implied by the user of said component definitions to form a first bi-partite, spreading activation graph wherein an arc of said first bi-partite, spreading activation graph connects a node representing one of said component definitions to at least one node representing at least one of said resources;

an instance net representing created instances of components defined in said a priori net interactively selected by the configurator user, said instances being logically coupled to instances of said resources to form a second bi-partite graph, wherein an arc of said second bi-partite graph connects a node representing one of said instances to at least one node representing at least one instance of said implied resources; and a logic engine coupled to said a priori net and said instance net, wherein said logic engine accepts requests from the configurator user to connect selected components, matches the requests to said component definitions, automatically propagates logical implications of configurator user requests across as many nodes of said first bi-partite, spreading activation graph and said second bi-partite graph as are required to build a complete set of interconnected components fulfilling said configurator user requests, creates and connects said selected instances of said selected components in said second bi-partite graph only if creation and connection of said selected instances are valid based on said component definitions in said a priori net and previous configurator user requests, validity being determined by analyzing the relationships between nodes contained in said first bi-partite, spreading activation graph and said second bi-partite graph and connection constraints, and reports the configuration resulting from said requests to the configurator user.

17. The computer-based, non-ruled-based configurator expert system as in claim 16, further comprising a loader module coupled to said a priori net, wherein said loader module converts said component definitions declaratively specified by the configurator developer from a text-based external format to said fist bi-partite, spreading activation graph-based internal format, and loads said component definitions represented in said first bi-partite, spreading activation graph-based internal format into said a priori net.

18. The computer-based, non-rule-based configurator expert system as in claim 17, further comprising an interface module coupled to said loader module and said logic engine, where said interface module receives said component definitions from the configurator developer, forwards said component definitions to said loader module, accepts said requests to connect selected components from the configurator user via an input device, forwards said requests to said logic engine, and displays the configuration received from said logic engine on a display means to the configurator user.

19. The computer-based, non-rule-based configurator expert system as in claim 18, further comprising a net definition knowledge base referenced by said loader module and said logic engine, said net definition knowledge base having at least one piece of knowledge relating to the type of objects that may represent said component definitions.

20. A computer-based, non-rule-based configurator expert system using control logic based on spreading activation and graphs as a knowledge representation for generating a complete, valid, near-optimal configuration of components connected to form a computer system, the configurator expert system being customized for a given computer system configuration domain by a configurator developer, and operated by a configurator user to generate a configuration solution based on configurator user requests, predetermined computer system component requirements and connection constraints contained in computer system component definitions, said computer-based, non-rule-based configurator expert system comprising:

an a priori net representing computer system component definitions declaratively specified by the configurator developer, said computer system component definitions being logically coupled to resources implied by the use of said computer system component definitions to form a first bi-partite, spreading activation graph wherein an arc of said first bi-partite, spreading activation graph connects a node representing one of said component definitions to at least one node representing at lest one of said resources;

an instance net representing instances of computer system components defined in said a priori net interactively selected by the configurator user, said instances being logically coupled to instances of said resources to form a second bi-partite graph, wherein an arc of said second bi-partite graph connects a node representing one of said instances to at least one node representing at least one instance of said resources; and a logic engine coupled to said a priori net and said instance net, wherein said logic engine accepts requests from the configurator user to connect selected computer system components, matches the requests to said computer system component definitions, automatically propagates logical implications of configurator user requests across as many nodes of said first bi-partite, spreading activation graph and said second bi-partite graph as are required to build a complete set of interconnected computer system components fulfilling said configurator user requests, creates and connects selected instances of said selected computer system components in said second bi-partite graph only if creation and connection of said selected instances are valid based on said computer system component definitions and previous configurator user requests, validity being determined by analyzing the relationships between nodes inherent in said first bi-partite, spreading activation graph and said second bi-partite graph, and connection constraints, and reports the configuration resulting from said requests to the configurator user.

21. The computer-based, non-rule-based configurator expert system as in claim 20, further comprising a loader module coupled to said a priori net, wherein said loader module converts said computer system component definitions declaratively specified by the configurator developer from a text-based external format to said first bi-partite, spreading activation graph-based internal format, and loads computer system component definitions represented in said first bi-partite, spreading activation graph-based internal format into said a priori net.

22. The computer-based, non-rule-based configurator expert system as in claim 21, further comprising an interface module coupled to said loader module and said logic engine, wherein said interface module accepts said requests to connect selected computer system components from the configurator user via an input device, forwards said requests to said logic engine, and displays the configuration received from said logic engine on a display means to the configurator user.

23. The computer-based, non-rule-based configurator expert system as in claim 22, further comprising a net definition knowledge base referenced by said loader module and said logic engine, said net definition knowledge base having at least one piece of knowledge relating to each type of objects that may represent said computer system component definitions.

24. The computer-based, non-rule-based configurator expert system as in claim 23, wherein said interface module further comprises a graphic user interface for accepting inputs from and displaying icons, menus, and data entry windows to the configurator user.

25. The computer-based, non-rule-based configurator expert system as in claim 24, wherein said expert system utilizes a system architecture based on the derivation of configuration knowledge by automatically propagating logical implications of configurator user requests across nodes of said first bi-partite, spreading activation graph and creating instances to fulfill said configurator user requests in said second bi-partite graph.

26. The computer-based, non-rule-based configurator expert system as in claim 25, wherein said a priori net can be defined, modified, updated, or maintained declaratively by the configurator developer via a text editor and said loader module, and said expert system may be modified without re-compiling any included computer programs.

27. The computer-based, non-rule-based configurator expert system as in claim 26, wherein said instance net can be modified, updated and maintained by the configurator user via the interface module.

28. A computer-implemented method for generating a complete, valid near-optimal configuration of connected components, wherein each component can be described by a component definition, said computer-implemented method comprising the steps of:
(a) declaratively defining components to be configured;
(b) representing the component definitions and the resources implied by their use as nodes in a first bi-partite, spreading activation graph, wherein an arc of said first bi-partite, spreading activation graph connects a first selected node representing one of said component definitions to at least one second selected node representing said resources;
(c) accepting a request to configure selected components from a configurator user;
(d) automatically propagating according to spreading activation the logical implications of implementing said configurator user request across multiple nodes of said fist bi-partite, spreading activation graph to build a complete set of interconnected components fulfilling said configurator user request by creating and connecting instances of said selected components and said resources defined in said first bi-partite, spreading activation graph as nodes in a second bi-partite graph in response to said configurator user requests;
(e) determining if said creation and connection of said instances is valid based on the component definitions, previous configurator user requests, and the current state of said second bi-partite graph;
(f) removing said instances from said second bi-partite graph if said creation and connection of said instances was determined to be invalid in the previous step; and
(g) reporting the configuration represented by said second bi-partite graph which resulted from said configurator user request to the configurator user.

29. The computer-implemented method of claim 28, wherein said representing step comprises the steps of:
(a) obtaining a definition of a current component from a declaratively specified text-based file of component definitions supplied by the configurator developer;
(b) creating an item node in said first bi-partite, spreading activation graph for said current component;
(c) loading said item node with information describing the requirements and constraints on connecting said current component to other components in said first bi-partite, spreading activation graph;
(d) creating one or more resource nodes representing resources implied by the user of said current component;
(e) connecting said item node with said resource nodes and any pre-existing item nodes supplying resources consumed by said item node; and
(f) repeating steps (a) through (e) for all components defined by the configurator developer.

30. The computer-implemented method of claim 28, wherein said accepting step comprises the steps of:
(a) displaying menus, icons, and data entry windows as part of a graphical user interface to the configurator user; and
(b) accepting configurator user requests to configure components by responding to commands and data entered via said menus, icons, and data entry windows.

31. The computer-implemented method of claim 28, wherein said reporting step comprises the steps of:
(a) converting the nodes of said second bi-partite graph into display objects capable of being displayed by a graphical user interface; and
(b) displaying said display objects on a display for viewing by the configurator user.

32. A computer-implemented method for generating a complete, valid near-optimal configuration of components connected to form a computer system, wherein each computer system component can be described by a computer system component definition, comprising the steps of:

(a) declaratively defining computer system components to be configured;

(b) representing the computer system component definitions and the resources implied by their use as nodes in a first bi-partite, spreading activation graph;

(c) accepting a request to configure selected computer system components from a configurator user;

(d) automatically propagating according to spreading activation the logical implications of implementing said configurator user request across multiple nodes of said first bi-partite, spreading activation graph to build a complete set of interconnected computer system components fulfilling said configurator user request by creating and connecting instances of said selected computer system components and said resources defined in said first bi-partite, spreading activation graph as nodes in a second bi-partite graph in response to said configurator user request;

(e) determining if said automatic spreading activation propagation and creation and connection of said instances is valid based on the computer system component definitions, previous configurator user requests, and the current state of said second bi-partite graph;

(f) removing said instances from said second bi-partite graph if said creation and connection of said instances was determined to be invalid in the previous step; and (g) reporting the computer system configuration represented by said second bi-partite graph which resulted from said request to the configurator user.

33. The computer-implemented method of claim 32, wherein said representing step comprises the steps of:

(a) obtaining a definition of a current computer system component from a declaratively specified, text-based file of computer system component definitions supplied by the configurator developer;

(b) creating an item node in said first bi-partite, spreading activation graph for said current computer system component;

(c) loading said item node with information describing the requirements and constraints on connecting said current computer system component to other computer system components in said first bi-partite, spreading activation graph;

(d) creating one or more resource nodes representing resources implied by the use of said current computer system component;

(e) connecting said item node with said resource nodes and any pre-existing item nodes supplying resources consumed by said item node; and (f) repeating steps (a) through (e) for all computer system components defined by the configurator developer.

34. The computer-implemented method of claim 32, wherein said accepting step comprises the steps of:

(a) displaying menus, icons, and data entry windows as part of a graphical user interface to the configurator user; and (b) accepting configurator user requests to connect computer system components by responding to commands and data entered via said menus, icons, and data entry windows.

35. The computer-implemented method of claim 32, wherein said reporting step comprises the steps of:

(a) converting the nodes of said second bi-partite graph into display objects capable of being displayed by a graphical user interface; and (b) displaying said display objects on a display for viewing by the configurator user.

* * * * *